US012696048B2

(12) United States Patent
Zhang et al.

(10) Patent No.: US 12,696,048 B2
(45) Date of Patent: Jul. 28, 2026

(54) EXTERNAL ASSISTED APPLICATION MOBILITY IN EDGE COMPUTING

(71) Applicant: Telefonaktiebolaget LM Ericsson (publ), Stockholm (SE)

(72) Inventors: Fengpei Zhang, Guangzhou (CN); Jing Su, Guangzhou (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 444 days.

(21) Appl. No.: 18/033,642

(22) PCT Filed: Oct. 27, 2020

(86) PCT No.: PCT/CN2020/123863
§ 371 (c)(1),
(2) Date: Apr. 25, 2023

(87) PCT Pub. No.: WO2022/087808
PCT Pub. Date: May 5, 2022

(65) Prior Publication Data
US 2023/0396954 A1     Dec. 7, 2023

(51) Int. Cl.
*H04W 4/021* (2018.01)
*H04W 36/32* (2009.01)
(52) U.S. Cl.
CPC .......... *H04W 4/022* (2013.01); *H04W 36/322* (2023.05)
(58) Field of Classification Search
CPC ...... H04W 4/022; H04W 36/322; H04L 12/12
USPC .................. 370/329, 331; 455/404.2, 414.2, 455/436–444, 456.1–457
See application file for complete search history.

(56) References Cited

U.S. PATENT DOCUMENTS

2013/0250810 A1* 9/2013 Ho ........................... H04L 45/02
                                                                370/255
2018/0184304 A1* 6/2018 Frenger ................. H04W 24/10
(Continued)

FOREIGN PATENT DOCUMENTS

WO        2016209128 A1    12/2016
WO        2017091960 A1     6/2017
WO        2020098663 A1     5/2020
(Continued)

OTHER PUBLICATIONS

Author Unknown, "Mobile Edge Computing (MEC); End to End Mobility Aspects," Group Report 018, Version 1.1.1, Oct. 2017, ETSI, 52 pages.

(Continued)

*Primary Examiner* — Michael Y Mapa
(74) *Attorney, Agent, or Firm* — Weisberg I.P. Law, P.A.

(57) ABSTRACT

The present disclosure is related to method and network elements for external assisted application mobility for edge computing. A method at a first network element for assisting a user equipment (UE) in mobile edge host switching comprises: setting up one or more geofences, one for each of one or more mobile edge hosts, based on topology information of a network comprising the one or more mobile edge hosts; detecting whether the UE moves across the boundary of a first geofence of the geofences; and transmitting, to a second network element, a message comprising a first indicator indicating a first host switching event for the UE in response to detecting that the UE moves across the boundary of the first geofence.

10 Claims, 11 Drawing Sheets

(56)  References Cited

U.S. PATENT DOCUMENTS

2021/0006972 A1 * 1/2021 Guim Bernat ...... H04W 12/041
2023/0026671 A1 * 1/2023 Seed ................. H04W 36/0033

FOREIGN PATENT DOCUMENTS

WO        2020212151 A1    10/2020
WO        2021227066 A1    11/2021

OTHER PUBLICATIONS

Author Unknown, "Multi-access Edge Computing (MEC); Framework and Reference Architecture," Group Specification 003, Version 2.1.1, Jan. 2019, ETSI, 21 pages.
Author Unknown, "Multi-access Edge Computing (MEC); Application Mobility Service API," Group Specification 021, Version 2.1.1, Jan. 2020, ETSI, 47 pages.
Kekki, et al., "MEC in 5G networks," ETSI White Paper No. 28, First Edition, Jun. 2018, 28 pages.
International Search Report and Written Opinion for International Patent Application No. PCT/CN2020/123863, mailed Jul. 27, 2021, 9 pages.

* cited by examiner

<u>1100</u>

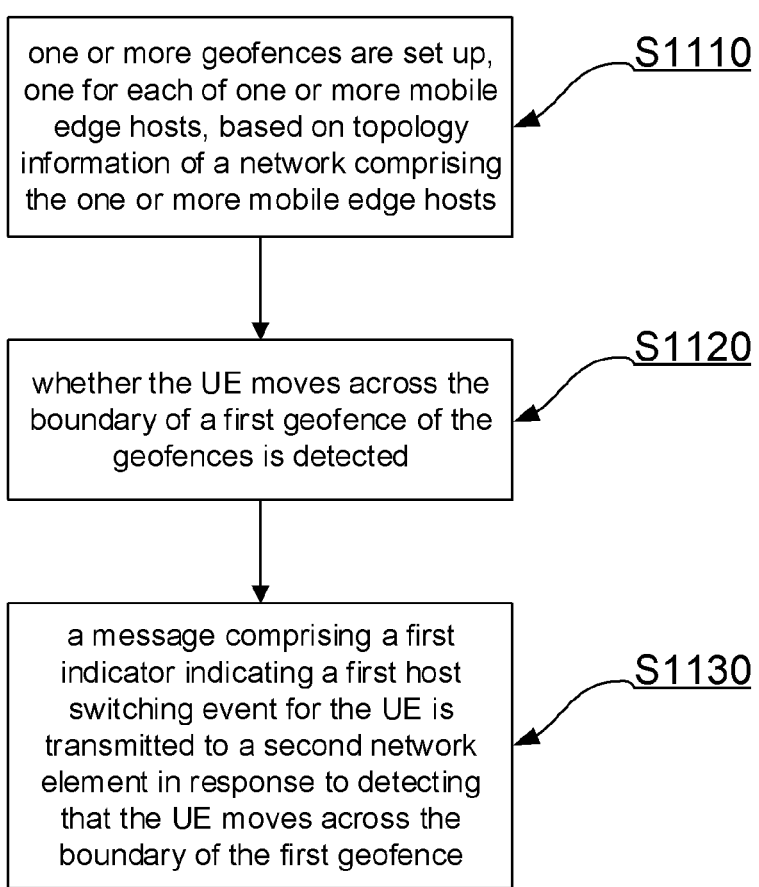

one or more geofences are set up, one for each of one or more mobile edge hosts, based on topology information of a network comprising the one or more mobile edge hosts — S1110 whether the UE moves across the boundary of a first geofence of the geofences is detected — S1120 a message comprising a first indicator indicating a first host switching event for the UE is transmitted to a second network element in response to detecting that the UE moves across the boundary of the first geofence — S1130

FIG. 11

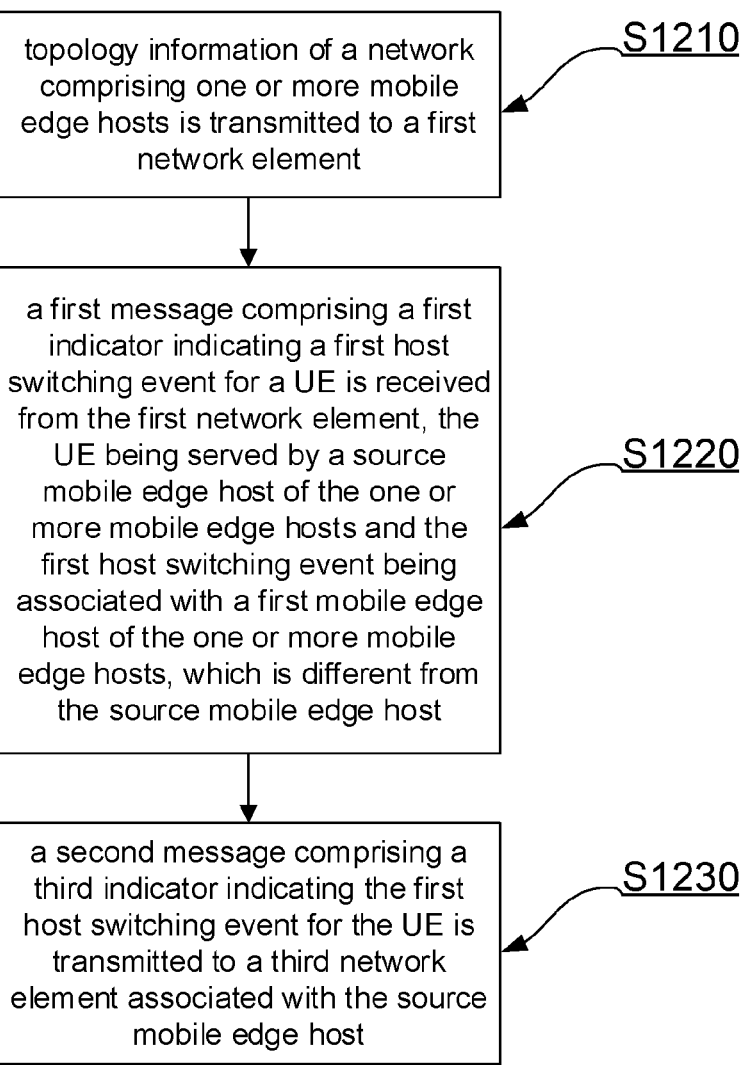

1200

S1210 topology information of a network comprising one or more mobile edge hosts is transmitted to a first network element

S1220 a first message comprising a first indicator indicating a first host switching event for a UE is received from the first network element, the UE being served by a source mobile edge host of the one or more mobile edge hosts and the first host switching event being associated with a first mobile edge host of the one or more mobile edge hosts, which is different from the source mobile edge host

S1230 a second message comprising a third indicator indicating the first host switching event for the UE is transmitted to a third network element associated with the source mobile edge host

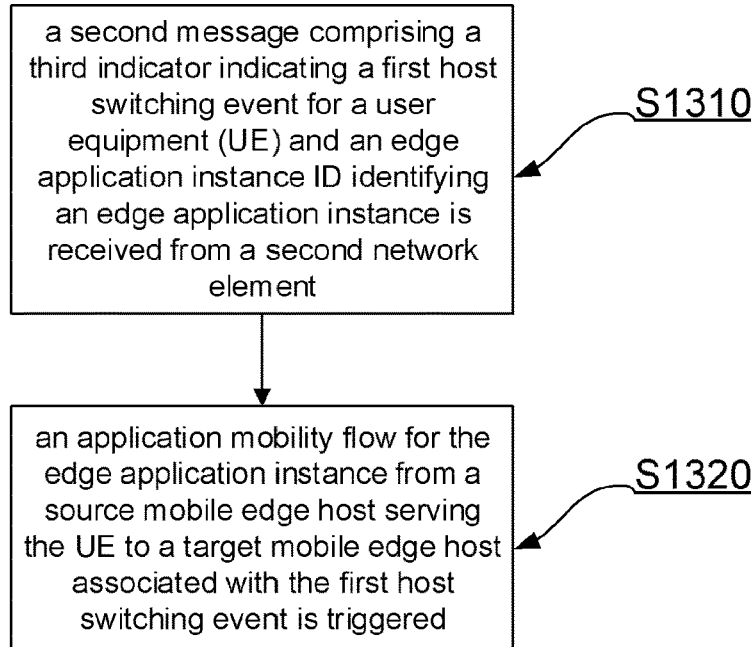

a second message comprising a third indicator indicating a first host switching event for a user equipment (UE) and an edge application instance ID identifying an edge application instance is received from a second network element — S1310 an application mobility flow for the edge application instance from a source mobile edge host serving the UE to a target mobile edge host associated with the first host switching event is triggered — S1320

FIG. 13

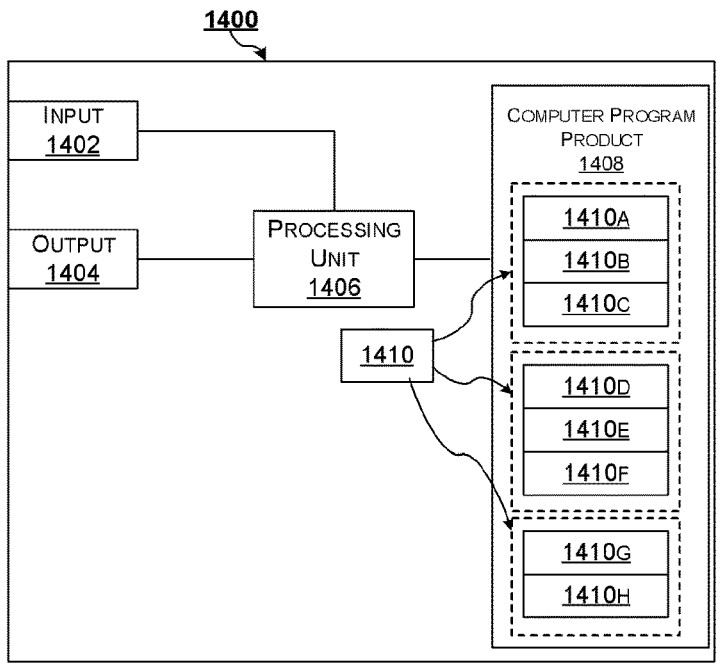

1400

INPUT
1402

OUTPUT
1404

PROCESSING
UNIT
1406

1410

COMPUTER PROGRAM
PRODUCT
1408

EXTERNAL ASSISTED APPLICATION MOBILITY IN EDGE COMPUTING

This application is a 35 U.S.C. § 371 national phase filing of International Application No. PCT/CN2020/123863, filed Oct. 27, 2020, the disclosure of which is incorporated herein by reference in its entirety.

TECHNICAL FIELD

The present disclosure is related to the field of telecommunications, and in particular, to external assisted application mobility in edge computing.

BACKGROUND

Edge computing as an evolution of cloud computing brings application hosting from centralized data centers down to the network edge, closer to consumers and the data generated by applications. Edge computing is acknowledged as one of the key pillars for meeting the demanding Key Performance Indicators (KPIs) of 5G, especially as far as low latency and bandwidth efficiency are concerned. However, not only is edge computing in telecommunications networks a technical enabler for the demanding KPIs, it also plays an essential role in the transformation of the telecommunications business, where telecommunications networks are turning into versatile service platforms for industry and other specific customer segments. This transformation is supported by edge computing, as it opens the network edge for applications and services, including those from third parties.

European Telecommunications Standards Institution (ETSI) Industry Specification Group (ISG) MEC (Multi-access Edge Computing) is the home of technical standards for edge computing. The group has already published a set of specifications (Phase 1) focusing on management and orchestration (MANO) of MEC applications, application enablement API, service Application Programming Interfaces (APIs) and the User Equipment (UE) application API. The MANO and application enablement functions contribute to enabling service environments in edge data centers, while the service APIs enable the exposure of underlying network information and capabilities to applications. One of the key value-adding features of the MEC specification is this ability for applications to gain contextual information and real-time awareness of their local environment through these standardized APIs. This local services environment is a flexible and extendable framework, as new services can be introduced, for example, by Third Generation Partnership Project (3GPP), when creating new service APIs. And finally, the UE application API lets the client application in the UE interact with the MEC system for application lifecycle management.

5G networks based on the 3GPP 5G specifications are a key future target environment for MEC deployments. The 5G system specification and its Service Based Architecture (SBA) leverage the service-based interactions between different network functions, aligning system operations with the network virtualization and Software Defined Networking paradigms. These very same characteristics are shared by MEC specifications. In addition, 3GPP 5G system specifications define the enablers for edge computing, allowing a MEC system and a 5G system to collaboratively interact in traffic routing and policy control related operations. MEC features together with these complementary technical enablers of the 5G system allow integration of these systems to create of a powerful environment for edge computing.

Since user mobility in mobile systems is inevitable when a UE moves within a mobile network, a mobile edge host (or a MEC host) serving the UE can be changed to another. Switching mobile edge host (might include application relocation and user context transfer) is a complicated and time consuming task. Therefore, it is incredibly challenging to ensure quality of experience (QoE) during mobile edge host switch, especially in highly mobile, low latency scenario, such as connected vehicles. Therefore, accurate prediction of the target mobile edge host by which the UE is to be served is an important issue in edge computing system.

MEC has introduced an "Application Mobility Service (AMS)" to facilitate application mobility. AMS subscribes to cell change notifications for a UE or UEs in the cell(s) (radio nodes) associated to an MEC host from another MEC service called "Radio Network Information Service (RNIS)". When a tracked UE moves across a cell's boundary of the underlying network, the RNIS will send event notifications about cell changes to the AMS. This may trigger application mobility procedures. In existing solution, since the trigger of application mobility is based on cell change event, the application mobility timing might be too late so that low latency may not be guaranteed during MEC host switch.

Additionally, ETSI GR MEC 018 shows an example of the prediction on MEC host switch timing for the connected car use case. The transit time in each cell can be estimated by the assistance of a UE application (e.g. a car navigation system) or by a MEC-based solution. However, such a prediction may have its own problems, such as, trip planning in the car navigation system is not always available and accurate. The driver could still drive without using navigation or change his/her driving route at the last minute.

SUMMARY

According to a first aspect of the present disclosure, a method at a first network element for assisting a user equipment (UE) in mobile edge host switching is provided. The method includes that one or more geofences are set up, one for each of one or more mobile edge hosts, based on topology information of a network including the one or more mobile edge hosts. The method further includes that whether the UE moves across the boundary of a first geofence of the geofences is detected. The method further includes that a message including a first indicator indicating a first host switching event for the UE is transmitted to a second network element in response to detecting that the UE moves across the boundary of the first geofence.

In some embodiments, before the step of setting up one or more geofences, the method further includes that the topology information is received from the second network element. In some embodiments, before the step of receiving the topology information, the method further includes that a request for subscribing latest topology information of the network is transmitted to the second network element. The method further includes that a response indicating success of the subscription is received from the second network element in response to the request. In some embodiments, the received topology information includes at least one of: at least one cell identifier; at least one base station identifier; at least one routing area identifier; at least one tracking area identifier; at least one geographic area information associated with at least one geographic area; and at least one civic address information associated with at least one civic address.

In some embodiments, the step of setting up one or more geofences includes that a request for querying geographic information associated with the topology information is transmitted to a database. The step of setting up one or more geofences further includes that the geographic information is received from the database. The step of setting up one or more geofences further includes that the one or more geofences are set up based on the received geographic information. In some embodiments, the geographic information includes, for each cell associated with each of the one or more mobile edge hosts, the longitude and latitude of the center of the cell and the radius of the cell. In some embodiments, a geofence for a mobile edge host is a union of sub-geofences corresponding to cells associated with the mobile edge host, each of the sub-geofences having a same center as that of its corresponding cell and a greater radius than that of its corresponding cell by an extended length. In some embodiments, the extended length is dynamically adjustable on a cell basis.

In some embodiments, the step of detecting whether the UE moves across the boundary of a first geofence of the geofences includes that location reports indicating current locations of the UE periodically are received from the UE. The step of detecting whether the UE moves across the boundary of a first geofence of the geofences further includes that whether the UE moves across the boundary of the first geofence is determined based on at least two consecutively received location reports, the prior one of which indicating that the UE is located outside of the first geofence and the subsequent one of which indicating that the UE is located inside of the first geofence. In some embodiments, each of the location reports further includes an edge application instance ID indicating an edge application instance by which the UE is being served, and wherein the message transmitted to the second network element further includes the edge application instance ID and a source mobile edge host ID associated with the edge application instance and indicating a mobile edge host currently serving the UE.

In some embodiments, before the step of transmitting, to a second network element, a message including a first indicator indicating a first host switching event for the UE in response to detecting that the UE moves across the boundary of the first geofence, the method further includes that whether the UE moves across the boundary of a second geofence of the geofences is detected, wherein the message transmitted to the second network element further includes a second indicator indicating a second host switching event for the UE in response to detecting that the UE moves across the boundary of the second geofence.

According to a second aspect of the present disclosure, a first network element is provided. The first network element includes: a processor; a memory storing instructions which, when executed by the processor, cause the processor to perform any of the methods of the first aspect.

According to a third aspect of the present disclosure, a method at a second network element for assisting a user equipment (UE) in mobile edge host switching is provided. The method includes that topology information of a network including one or more mobile edge hosts is transmitted to a first network element. The method further includes that a first message including a first indicator indicating a first host switching event for a UE is received from the first network element, the UE being served by a source mobile edge host of the one or more mobile edge hosts and the first host switching event being associated with a first mobile edge host of the one or more mobile edge hosts, which is different from the source mobile edge host. The method further includes that a second message including a third indicator indicating the first host switching event for the UE is transmitted to a third network element associated with the source mobile edge host.

In some embodiments, before the step of transmitting the topology information, the method further includes that a request for subscribing latest topology information of the network is received from the first network element. The method further includes that a response indicating success of the subscription is transmitted to the first network element in response to the request. In some embodiments, the transmitted topology information includes at least one of: at least one cell identifier; at least one base station identifier; at least one routing area identifier; at least one tracking area identifier; at least one geographic area information associated with at least one geographic area; and at least one civic address information associated with at least one civic address. In some embodiments, the first message further includes an edge application instance ID indicating an edge application instance by which the UE is being served and a source mobile edge host ID associated with the source mobile edge host, and wherein the second message further includes the edge application instance ID. In some embodiments, the first message further includes a second indicator indicating a second host switching event for the UE, the second host switching event being associated with a second mobile edge host of the one or more mobile edge hosts, which is different from the source mobile edge host and the first mobile edge host, wherein the second message further includes a fourth indicator indicating the second host switching event for the UE.

According to a fourth aspect of the present disclosure, a second network element is provided. The second network element includes: a processor; a memory storing instructions which, when executed by the processor, cause the processor to perform any of the methods of any of the third aspect.

According to a fifth aspect of the present disclosure, a method at a third network element for assisting a user equipment (UE) in mobile edge host switching is provided. The method includes that a second message including a third indicator indicating a first host switching event for a user equipment (UE) and an edge application instance ID identifying an edge application instance is received from a second network element. The method further includes that an application mobility flow for the edge application instance from a source mobile edge host serving the UE to a target mobile edge host associated with the first host switching event is triggered.

In some embodiments, the second message further includes a fourth indicator indicating a second host switching event for the UE, and wherein the method further includes: another application mobility flow for the edge application instance from the source mobile edge host serving the UE to another target mobile edge host associated with the second host switching event is triggered. In some embodiments, the method further includes that a request for registering an edge application instance which is executed at the source mobile edge host is received, the request including an indicator indicating that an external cloud application corresponding to the edge application instance is capable of assisting UEs in mobile edge host switching.

According to a sixth aspect of the present disclosure, a third network element is provided. The third network element includes: a processor; a memory storing instructions which, when executed by the processor, cause the processor to perform any of the methods of any of the fifth aspect.

According to a seventh aspect of the present disclosure, a computer program including instructions is provided. The instructions, when executed by at least one processor, cause the at least one processor to carry out any of the methods of any of the first, third, and fifth aspects.

According to an eighth aspect of the present disclosure, a carrier containing the computer program of the seventh aspect is provided, wherein the carrier is one of an electronic signal, optical signal, radio signal, or computer readable storage medium.

According to a ninth aspect of the present disclosure, a system for assisting a user equipment (UE) in mobile edge host switching is provided. The system includes: a first network element of the second aspect; a second network element of the fourth aspect; and a third network element of the sixth aspect.

In some embodiments, the first network element is a connected vehicle platform serving the UE, the second network element is a cloud application proxy, and the third network element is an application mobility service.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and therefore are not to be considered limiting of its scope, the disclosure will be described with additional specificity and detail through use of the accompanying drawings.

FIG. 11 is a flow chart of an exemplary method at a first network element for assisting a UE in mobile edge host switching according to an embodiment of the present disclosure.

FIG. 12 is a flow chart of an exemplary method at a second network element for assisting a UE in mobile edge host switching according to an embodiment of the present disclosure.

FIG. 13 is a flow chart of an exemplary method at a third network element for assisting a UE in mobile edge host switching according to an embodiment of the present disclosure.

FIG. 14 schematically shows an embodiment of an arrangement which may be used in a first network element, a second network element, and/or a third network element according to an embodiment of the present disclosure.

DETAILED DESCRIPTION

Figure 1:
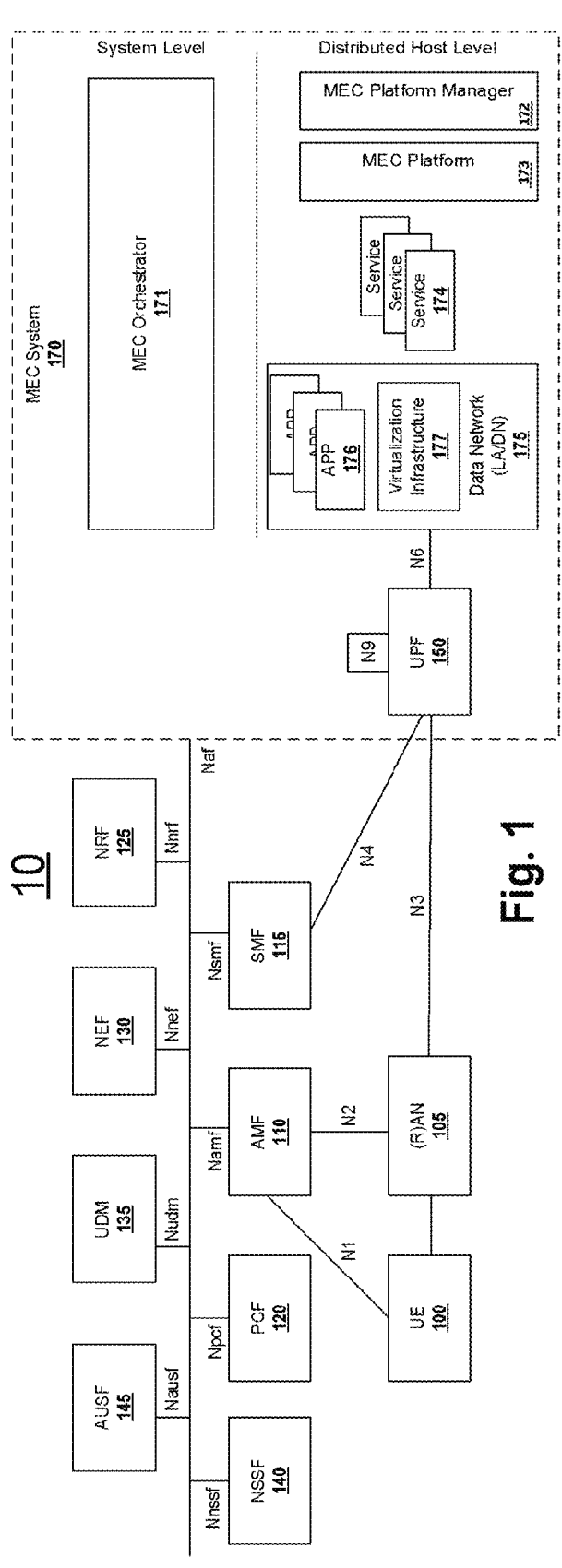
FIG. 1 is a diagram illustrating an exemplary telecommunications network in which an MEC system is integrated in which an external assisted application mobility mechanism according to an embodiment of the present disclosure may be applicable.

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Those skilled in the art will appreciate that the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Conditional language used herein, such as "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below. In addition, language such as the phrase "at least one of X, Y and Z," unless specifically stated otherwise, is to be understood with the context as used in general to convey that an item, term, etc. may be either X, Y, or Z, or a combination thereof.

The terminology used herein is for the purpose of describing particular embodiments only and is not intended to be limitation of example embodiments. As used herein, the singular forms "a", "an", and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. It will be also understood that the terms "connect(s),""connecting", "connected", etc. when used herein, just mean that there is an electrical or communicative connection between two elements and they can be connected either directly or indirectly, unless explicitly stated to the contrary.

Of course, the present disclosure may be carried out in other specific ways than those set forth herein without departing from the scope and essential characteristics of the disclosure. One or more of the specific processes discussed below may be carried out in any electronic device comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure will be illustrated in the accompanying Drawings and described in the following Detailed Description, it should be understood that the disclosure is not limited to the disclosed embodiments, but instead is also capable of numerous rearrangements, modifications, and substitutions without departing from the present disclosure that as will be set forth and defined within the claims.

Further, please note that although the following description of some embodiments of the present disclosure is given in the context of 5th Generation New Radio (5G NR), the present disclosure is not limited thereto. In fact, as long as BDT management based on dynamic tariff data is involved, the inventive concept of the present disclosure may be applicable to any appropriate communication architecture, for example, to Global System for Mobile Communications (GSM)/General Packet Radio Service (GPRS), Enhanced Data Rates for GSM Evolution (EDGE), Code Division Multiple Access (CDMA), Wideband CDMA (WCDMA), Time Division—Synchronous CDMA (TD-SCDMA), CDMA2000, Worldwide Interoperability for Microwave Access (WiMAX), Wireless Fidelity (Wi-Fi), Long Term Evolution (LTE), etc. Therefore, one skilled in the arts could readily understand that the terms used herein may also refer to their equivalents in any other infrastructure. For example, the term "User Equipment" or "UE" used herein may refer to a mobile device, a mobile terminal, a mobile station, a user device, a user terminal, a wireless device, a wireless terminal, an IoT device, a vehicle, or any other equivalents. For another example, the term "gNB" used herein may refer to a base station, a base transceiver station, an access point, a hot spot, a NodeB (NB), an evolved NodeB (eNB), a network element, or any other equivalents. Further, the term "node" used herein may refer to a UE, a functional entity, a network entity, a network element, a network equipment, or any other equivalents.

Further, following ETSI documents are incorporated herein by reference in their entireties:

ETSI GS MEC 003 V2.1.1 (2019-01), Multi-access Edge Computing (MEC); Framework and Reference Architecture;

ETSI GR MEC 018 V1.1.1 (2017-10), Mobile Edge Computing (MEC); End to End Mobility Aspects;

ETSI GS MEC 021 V2.1.1 (2020-01), Multi-access Edge Computing (MEC); Application Mobility Service API; and ETSI White Paper No. 28, MEC in 5G networks.

FIG. 1 is a diagram illustrating an exemplary telecommunications network 10 in which an MEC system 710 is integrated. In the network 10, an external assisted application mobility mechanism according to an embodiment of the present disclosure may be applicable.

As shown in FIG. 1, the network 10 may comprise one or more UEs 100 and a (radio) access network ((R)AN) node 105, which could be a base station, a Node B, an evolved NodeB (eNB), a gNB, or any entity which provides the UEs 100 with access to other elements of the network 10. Further, the network 10 may comprise its core network portion which may comprise (but not limited to) an Access and Mobility Management Function (AMF) 110, a Session Management function (SMF) 115, a Policy Control Function (PCF) 120, a Network Repository Function (NRF) 125, a Network Exposure Function (NEF) 130, a Unified Data Management (UDM) 135, a Network Slice Selection Function (NSSF) 140, an AUthentication Server Function (AUSF) 145, and a User Plane Function (UPF) 150. As shown in FIG. 1, these entities may communicate with each other via the service-based interfaces, such as, Namf, Nsmf, Npcf, etc. and/or the reference points, such as, N1, N2, N3, N4, N6, N9, etc.

However, the present disclosure is not limited thereto. In some other embodiments, the network 10 may comprise additional network functions, less network functions, or some variants of the existing network functions shown in FIG. 1. For example, in a network with the 4G LTE architecture, the entities which perform these functions may be different from those shown in FIG. 1. For another example, in a network with a mixed 4G/5G architecture, some of the entities may be same as those shown in FIG. 1, and others may be different. Further, the functions shown in FIG. 1 are not essential to the embodiments of the present disclosure. In other words, some of them may be missing from some embodiments of the present disclosure. Further, a network function or network node can be implemented either as a network element on a dedicated hardware, as a software instance running on a dedicated hardware, or as a virtualized function instantiated on an appropriate platform, e.g. on a cloud infrastructure.

Here, some of the functions shown in FIG. 1, such as AMF 110, SMF 115, and UPF 150 will be described in detail below.

Referring to FIG. 1, the AMF 110 may perform most of the functions that a Mobility Management Entity (MME) performs in a 4G network. Below please find a brief list of some of its functions:

Terminates the RAN Control Plane (CP) interface (N2);
Non-access stratum (NAS) signaling;
NAS ciphering and integrity protection;
Mobility Management (MM) layer NAS termination;
Session Management (SM) layer NAS forwarding;
Authenticates UE;
Manages the security context;
Registration management;
Connection management;
Reachability management;
Mobility Management; and
Apply mobility related policies from PCF (e.g. mobility restrictions).

Further, the SMF 115 may perform the session management functions that are handled by the 4G MME, Serving Gateway—Control Plane (SGW-C), and PDN Gateway— Control Plane (PGW-C). Below please find a brief list of some of its functions:

Allocates IP addresses to UEs;
NAS signaling for session management (SM);
Sends QoS and policy information to RAN via the AMF;
Downlink data notification;
Select and control UPF for traffic routing;
Acts as the interface for all communication related to offered user plane services; and
Lawful intercept—control plane.

Further, the UPF 150 is essentially a fusion of the data plane parts of the SGW and PGW. In the context of the Control and User Plane Separation (CUPS) architecture: EPC SGW-U+EPC PGW-U→5G UPF.

The UPF 150 may perform the following functions:
Packet routing and forwarding
Packet inspection and QoS handling, and the UPF 150 may optionally integrate a Deep Packet Inspection (DPI) for packet inspection and classification;
Connecting to the Internet POP (Point of Presence), and the UPF 150 may optionally integrate the Firewall and Network Address Translation (NAT) functions;
Mobility anchor for Intra Radio Access Technology (RAT) and Inter-RAT handovers;
Lawful intercept—user plane; and
Maintains and reports traffic statistics.

As shown in FIG. 1, the UPF 150 may be deployed closer to the network edge, that is, in the MEC system 170, and may be communicatively connected to a (Local Area) Data Network (LA/DN) 175 which may be a part of the MEC system 170.

The 5G system architecture mentioned above has been designed to cater for a wide set of use cases ranging from a massive amount of simple IoT devices to the other extreme of high bit rate, high reliability mission critical services. Supporting all the use cases with the same and common architecture has required significant changes in design philosophies both for the RAN and the core network.

One significant architectural change was made to the communications between the core network functions that until now have relied on a point-to-point paradigm. In the 5G system specification there are two options available for the architecture; one with the traditional reference point and interface approach and the other where the core network functions interact with each other using a Service Based Architecture (SBA). In the present disclosure, the emphasis is on the SBA option of the 5G system architecture.

With the SBA, there are functions that consume services and those that produce services. Any network function can offer one or more services. The framework provides the necessary functionality to authenticate the consumer and to authorize its service requests. The framework supports flexible procedures to efficiently expose and consume services. For simple service or information requests, a request-response model can be used. For any long-lived processes, the framework also supports a subscribe-notify model. The API framework defined by ETSI ISG MEC is aligned with these principles and in fact does exactly the same for MEC applications as the SBA does for network functions and their services. The functionality needed for efficient use of the services includes registration, service discovery, availability notifications, de-registration and authentication and authorization. All this functionality is the same in both the SBA and the MEC API frameworks.

The network functions and the services they produce are registered in the Network Resource Function (NRF) 125, while in the MEC system 170 the services produced by the MEC applications 176 are registered in the service registry of the MEC platform 173. Service registration is part of the Application Enablement functionality. To use the service, if authorized, a network function can directly interact with the network function that produces the service. The list of available services can be discovered from the NRF 125. Some of the services are accessible only via the NEF 130, which is also available to untrusted entities that are external to the domain, to access the service. In other words, the NEF 130 acts as a centralized point for service exposure and also has a key role in authorizing all access requests originating from outside of the network 10.

Policies and rules in the network 10 are handled by the PCF 120. The PCF 120 is also the function who services AF (such as the MEC platform 170) requests in order to impact the traffic steering rules. The PCF 120 can be accessed either directly, or via the NEF 130, depending whether the AF is considered trusted or not, and in the case of traffic steering, whether the corresponding PDU session is known at the time of the request.

In the MEC system 170 on the right-hand side of FIG. 1, the MEC orchestrator 171 is a MEC system level functional entity that, acting as an AF, can interact with the NEF 130, or in some scenarios directly with the target 5G NFs. On the MEC host level, it is the MEC platform 173 that can interact with these 5G NFs, again in the role of an AF. The MEC host, i.e. the host level functional entities, are most often deployed in a data network (e.g. the data network 175). While the NEF 130 as a Core Network function is a system level entity deployed centrally together with similar NFs, an instance of NEF 130 can also be deployed in the edge to allow low latency, high throughput service access from a MEC host.

It is assumed that MEC is deployed on the N6 reference point, i.e. in the data network 175. This is enabled by flexibility in locating the UPF 150. The distributed MEC host can accommodate, apart from MEC applications 176, a message broker as a MEC platform service, and another MEC platform service to steer traffic to local accelerators. The choice to run a service as a MEC application 176 or as a platform service 174 is likely to be an implementation choice and should factor in the level of sharing and authentication needed to access the service. A MEC service 174 such as a message broker could be initially deployed as a MEC application 176 to gain time-to-market advantage, and then become available as a MEC platform service 174 as the technology and the business model matures.

Managing user mobility is a central function in a mobile communications system. In the network 10, it is the AMF 110 that handles mobility related procedures as mentioned above. In addition, the AMF 110 is responsible for the termination of RAN control plane and Non-Access Stratum (NAS) procedures, protecting the integrity of signaling, management of registrations, connections and reachability, interfacing with the lawful interception function for access and mobility events, providing authentication and authorization for the access layer, and hosting the Security Anchor Functionality (SEAF). With the SBA, the AMF 110 provides communication and reachability services for other NFs and it also allows subscriptions to receive notifications regarding mobility events.

Similar to the AMF 110, the Session Management Function (SMF) 115 is in a key position with its large number of responsibilities. Some of the functionality provided by the SMF 115 includes session management, IP address allocation and management, DHCP services, selection/re-selection and control of the UPF 150, configuring the traffic rules for the UPF 150, lawful interception for session management events, charging and support for roaming. As MEC services may be offered in both centralized and edge clouds, the SMF 115 plays a critical role due to its role in selecting and controlling the UPF 150 and configuring its rules for traffic steering. The SMF 115 exposes service operations to allow the MEC system 170 as a 5G AF to manage the PDU sessions, control the policy settings and traffic rules as well as to subscribe to notifications on session management events.

Figure 2:
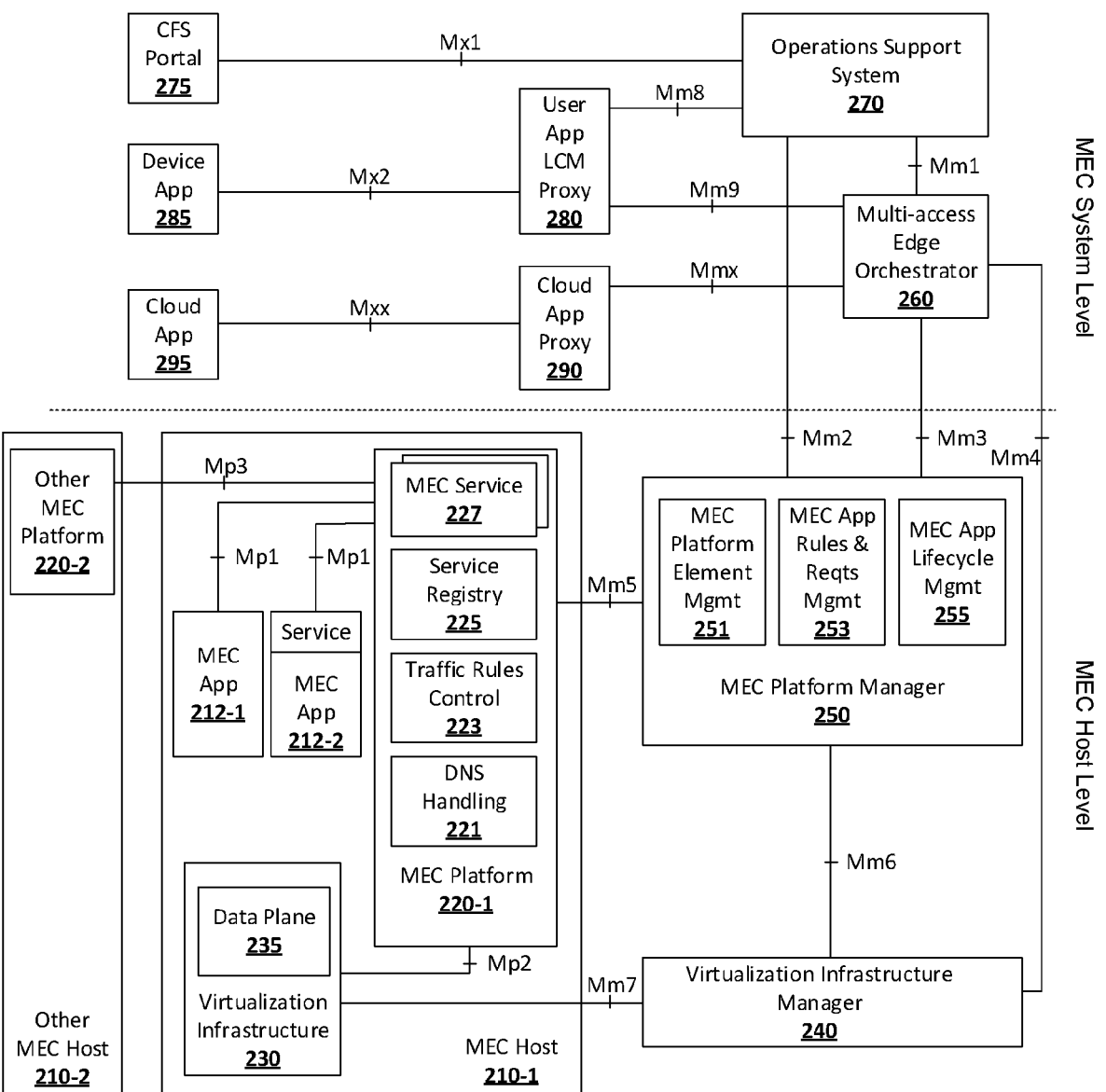
FIG. 2 is a diagram illustrating an exemplary reference architecture of an multi-access edge system for external assisted application mobility according to an embodiment of the present disclosure.

FIG. 2 is a diagram illustrating an exemplary reference architecture of an MEC system for external assisted application mobility according to an embodiment of the present disclosure. The reference architecture shows the functional elements that comprise the multi-access edge system (e.g. the MEC system 170 shown in FIG. 1) and the reference points between them. There are three groups of reference points defined between the system entities:

reference points regarding the MEC platform functionality (Mp);

management reference points (Mm); and reference points connecting to external entities (Mx).

The MEC system may consist of the MEC hosts 210-1 and/or 210-2 (hereinafter, referred to as 210 collectively), and the MEC management necessary to run MEC applications 212-1 and/or 212-2 (hereinafter, referred to as 212 collectively) within an operator network or a subset of an operator network (e.g. the network 10 shown in FIG. 1). The MEC host 210-1 is an entity that contains a MEC platform 220-1 and a virtualization infrastructure 230 which provides compute, storage, and network resources, for the purpose of running MEC applications 212-1 or 212-2. The MEC platform 220-1 is the collection of essential functionalities required to run MEC applications 212 on a particular virtualization infrastructure 230 and enable them to provide and consume MEC services (e.g. the service provided by the MEC application 212-2). The MEC platform 220-1 can also provide services 227. MEC applications 212 are instantiated on the virtualization infrastructure 230 of the MEC host 210-1 based on configuration or requests validated by the MEC management. Please note that, although FIG. 2 shows only two MEC hosts 210-1 and 210-2, the present disclosure is not limited thereto. In some other embodiments, more than two MEC hosts may be present in the MEC system.

The MEC management comprises the MEC system level management and the MEC host level management. The MEC system level management includes the multi-access edge orchestrator (MEO) 260 as its core component, which has an overview of the complete MEC system. The MEC host level management comprises the MEC platform manager 250 and the virtualization infrastructure manager 240, and handles the management of the MEC specific functionality of a particular MEC host (e.g. the MEC host 210-1) and the applications 212 running on it.

As shown in FIG. 2, the MEC host 210-1 is an entity that contains the MEC platform 220-1 and the virtualization infrastructure 230 which provides compute, storage, and network resources for the MEC applications 212. The virtualization infrastructure 230 includes a data plane 235 that executes the traffic rules received by the MEC platform 220-1, and routes the traffic among applications 212, services (e.g. the service provided by the MEC application 212-2 or the MEC services 227, or services from other MEC hosts), DNS server/proxy, 3GPP network (for example, the network 10 shown in FIG. 1), other access networks, local networks and external networks.

The MEC platform 220-1 may be responsible for the following functions:

offering an environment where the MEC applications 212 can discover, advertise, consume and offer MEC services, including, when supported, MEC services available via other platforms (that may be in the same or a different MEC system), for example, at least partially through the service registry 225;

receiving traffic rules from the MEC platform manager 250, applications 212, or services, and instructing the data plane 235 accordingly, for example, through the traffic rules control 223. When supported, this includes the translation of tokens representing UEs in the traffic rules into specific IP addresses;

receiving DNS records from the MEC platform manager 250 and configuring a DNS proxy/server accordingly, for example, through the DNS handling 221;

hosting MEC services 227; and/or providing access to persistent storage and time of day information.

The MEC applications 212 are running as virtual machines (VM) on top of the virtualization infrastructure 230 provided by the MEC host 210-1, and can interact with the MEC platform 220-1 to consume and provide MEC services.

In certain cases, the MEC applications 212 can also interact with the MEC platform 220-1 to perform certain support procedures related to the lifecycle of the application 212, such as indicating availability, preparing relocation of user state, etc.

The MEC applications 212 can have a certain number of rules and requirements associated to them, such as required resources, maximum latency, required or useful services, etc. These requirements are validated by the MEC system level management, and can be assigned to default values if missing.

As shown in FIG. 2, the MEO 260 is the core functionality in MEC system level management. The MEO 260 may be responsible for the following functions:

maintaining an overall view of the MEC system based on deployed MEC hosts, available resources, available MEC services, and topology;

on-boarding of application packages, including checking the integrity and authenticity of the packages, validating application rules and requirements and if necessary adjusting them to comply with operator policies, keeping a record of on-boarded packages, and preparing the virtualization infrastructure manager(s) to handle the applications;

selecting appropriate MEC host(s) for application instantiation based on constraints, such as latency, available resources, and available services;

triggering application instantiation and termination; and/or triggering application relocation as needed when supported.

The Operations Support System (OSS) 270 shown in FIG. 2 may refer to the OSS of an operator (e.g., the same operator of the network 10 shown in FIG. 1). It may receive requests from the Customer Facing Service (CFS) portal 275 and/or device applications 285 for instantiation or termination of applications, and it may decide on the granting of these requests. Granted requests may be forwarded to the MEO 260 for further processing. When supported, the OSS 270 may also receive requests from device applications for relocating applications between external clouds and the MEC system. Further, when supported, the MEO 260 may also receive requests/reports from the cloud application 295 via the cloud application proxy 290.

A user application (e.g. the MEC application 212-1 or 212-2) may be a MEC application that is instantiated in the MEC system in response to a request of a user via an application running in the device (for example, the device application 285). The user application lifecycle management (LCM) proxy 280 may allow the device application 285 to request on-boarding, instantiation, termination of user applications 212 and when supported, relocation of user applications 212 in and out of the MEC system. It also allows informing the device application 285 about the state of the user applications 212.

The user application lifecycle management proxy 280 may authorize requests from the device application 285 in the device (e.g. UE, laptop with Internet connectivity) and interact with the OSS 270 and the MEO 260 for further processing of these requests. The user application lifecycle management proxy 280 may be only available when supported by the MEC system.

Similarly, a user application (e.g. the MEC application 212-1 or 212-2) may be a MEC application that is instantiated in the MEC system in response to a request of a user via an application running in the cloud (for example, the cloud application 295).

The cloud application proxy 290 may authorize requests from the cloud application 295 in the cloud (e.g. a connected vehicle platform 495 as will be described with reference to FIG. 4) and interact with the MEO 260 for further processing of these requests. The cloud application proxy 290 may be only available when supported by the MEC system. In some embodiments, the cloud application 295 may use geofencing based on the MEC topology information exposed by the MEC system to detect the MEC host switch event of devices, and report the detected MEC host switch event back to the MEC system to trigger an application mobility procedure, such that the low latency communication can be ensured during the MEC host switch event, as will be described below.

As shown in FIG. 2, the MEC platform manager 250 may be responsible for the following functions:

managing the life cycle of applications including informing the MEO 260 of relevant application related events, for example, through the MEC application lifecycle management 255;

providing element management functions to the MEC platform 220, for example, through the MEC platform element management 251; and/or managing the application rules and requirements including service authorizations, traffic rules, DNS configuration and resolving conflicts, for example, through the MEC application Rules & Requirements management 253.

The MEC platform manager 250 may also receive virtualized resources fault reports and performance measurements from the virtualization infrastructure manager 240 for further processing.

The virtualization infrastructure manager 240 may be responsible for the following functions:

allocating, managing, and releasing virtualized (compute, storage, and networking) resources of the virtualization infrastructure 230;

preparing the virtualization infrastructure 230 to run a software image. The preparation includes configuring the infrastructure 230, and can include receiving and storing the software image;

when supported, rapid provisioning of applications 212;

collecting and reporting performance and fault information about the virtualized resources; and/or when supported, performing application relocation. For application relocation from/to external cloud environments, the virtualization infrastructure manager 240 interacts with the external cloud manager to perform the application relocation.

The CFS portal 275 may allow operators' third-party customers (e.g. commercial enterprises) to select and order a set of MEC applications 212 that meet their particular needs, and to receive back service level information from the provisioned applications 212.

Below please find some reference points related to the MEC platform 220-1:

Mp1: The Mp1 reference point between the MEC platform 220-1 and the MEC applications 212 provides service registration, service discovery, and communication support for services. It also provides other functionality such as application availability, session state relocation support procedures, traffic rules and DNS rules activation, access to persistent storage and time of day information, etc. This reference point can be used for consuming and providing service specific functionality.

Mp2: The Mp2 reference point between the MEC platform 220-1 and the data plane 235 of the virtualization infrastructure 230 may be used to instruct the data plane 235 on how to route traffic among applications 212, networks, services 227, etc.

Mp3: The Mp3 reference point between MEC platforms (e.g. the MEC platforms 220-1 and 220-2) may be used for control communication between the MEC platforms 220.

NOTE: Optionally control signaling can be exchanged between two MEC platforms in different MEC systems in order to facilitate feature specific inter-MEC system coordination. Such features include application mobility support and Vehicle-to-Everything (V2X) support.

Below please find some reference points related to the MEC management:

Mm1: The Mm1 reference point between the MEO 260 and the OSS 270 may be used for triggering the instantiation and the termination of the MEC applications 212 in the MEC system.

Mm2: The Mm2 reference point between the OSS 270 and the MEC platform manager 250 may be used for the MEC platform configuration, fault, and performance management.

Mm3: The Mm3 reference point between the MEO 260 and the MEC platform manager 250 may be used for the management of the application lifecycle, application rules and requirements and keeping track of available MEC services.

Mm4: The Mm4 reference point between the MEO 260 and the virtualization infrastructure manager 240 may be used to manage virtualized resources of the MEC host 210, including keeping track of available resource capacity, and to manage application images.

Mm5: The Mm5 reference point between the MEC platform manager 250 and the MEC platform 220 may be used to perform platform configuration, configuration of the application rules and requirements, application lifecycle support procedures, management of application relocation, etc.

Mm6: The Mm6 reference point between the MEC platform manager 250 and the virtualization infrastructure manager 240 may be used to manage virtualized resources e.g. to realize the MEC application lifecycle management 255.

Mm7: The Mm7 reference point between the virtualization infrastructure manager 240 and the virtualization infrastructure 230 may be used to manage the virtualization infrastructure 230.

Mm8: The Mm8 reference point between the user application lifecycle management proxy 280 and the OSS 270 may be used to handle device application requests for running applications 212 in the MEC system.

Mm9: The Mm9 reference point between the user application lifecycle management proxy 280 and the MEO 260 of the MEC system may be used to manage MEC applications 212 requested by the device application 285.

Mmx: The Mmx reference point between the cloud application proxy 290 and the MEO 260 of the MEC system may be used to interact with the MEC system as requested by the cloud application 295.

Below please find some reference points related to external entities:

Mx1: The Mx1 reference point between the OSS 270 and the CFS portal 275 may be used by the third-parties to request the MEC system to run applications 212 in the MEC system.

Mx2: The Mx2 reference point between the user application lifecycle management proxy 280 and the device application 285 may be used by the device application 285 to request the MEC system to run an application in the MEC system, or to move an application in or out of the MEC system. It is only available when supported by the MEC system.

Mxx: The Mxx reference point between the cloud application proxy 290 and the cloud application 295 may be used by the cloud application 295 to request interaction with the MEC system or vice versa.

Figure 3:
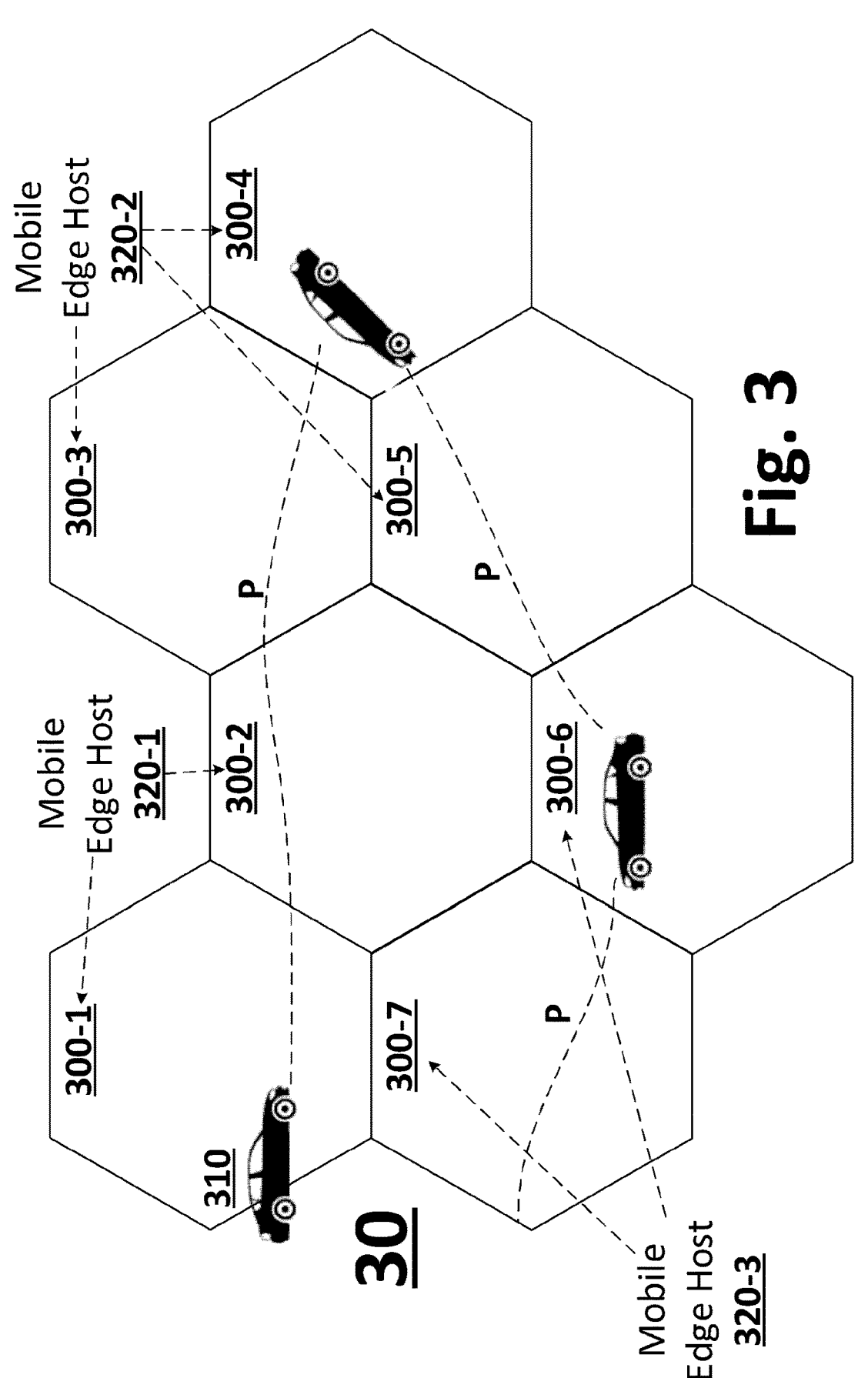
FIG. 3 is a diagram illustrating an exemplary scenario in which an external assisted application mobility mechanism according to an embodiment of the present disclosure may be applicable.

FIG. 3 is a diagram illustrating an exemplary scenario in which an external assisted application mobility mechanism according to an embodiment of the present disclosure may be applicable. As shown in FIG. 3, a radio network 30 in which an MEC system (e.g. that shown in FIG. 1 or FIG. 2) is integrated may provide radio coverage for a number of cells 300-1, 300-2, 300-3, 300-4, 300-5, 300-6, and 300-7 (hereinafter, the cells 300 collectively) in which a user equipment (e.g. a vehicle) 310 may be served. Further, each of the cells 300-1 through 300-7 is communicatively coupled to and associated with a mobile edge host or MEC host 320. For example, the cells 300-1 and 300-2 are associated with the mobile edge host 320-1, the cells 300-3, 300-4, and 300-5 are associated with the mobile edge host 320-2, and the cells 300-6 and 300-7 are associated with the mobile edge host 320-3. With one or more corresponding applications running on the MEC hosts 320, a lot of services can be provided to the vehicle 310, such as, navigation, traffic alert, autonomous driving, etc.

However, please note that the present disclosure is not limited to the specific configuration of the network 30. In some other embodiments, the network 30 may comprise more cells or MEC hosts, less cells or MEC hosts, different cell or MEC host arrangements. Further, the cells may be associated with a different number of MEC hosts, or a different mapping between the cells and the MEC hosts may be feasible. Furthermore, the UE 310 may be another device than the vehicle 310 in some other embodiments.

As shown in FIG. 3, the vehicle 310 may travel in the network 30 and cross the boundaries of the cells 300. When the vehicle 310 travels within the cells associated with a same MEC host 320, the application running on the MEC host 320 may typically function well. However, when the vehicle 310 crosses the boundaries, for example, when the vehicle 310 travels from the cell 300-2 associated with the MEC host 320-1 to the cell 300-3 associated with the MEC host 320-2 and then a handover from the cell 300-2 to the cell 300-3 for the vehicle 310 is completed, the RNIS as mentioned in the background section will send an event notification about this cell change to the AMS 320-1, and then an application relocation procedure for moving the corresponding MEC application from the MEC host 320-1 to the MEC host 320-2 will be triggered for the vehicle 310. As mentioned earlier, such a trigger of application mobility is based on cell change event, the application mobility timing might be too late so that low latency may not be guaranteed during this MEC host switch event. If an external cloud application (e.g. the cloud application 295) has the ability to detect MEC host switch event beforehand more accurately, the MEC system may allow the external cloud application to assist in an application mobility procedure to ensure low latency communication.

To this end, the reference architecture of the MEC system shown in FIG. 2 may be used. Next, a detailed description of an external assisted application mobility according to some embodiments of the present disclosure will be given with reference to FIG. 4 through FIG. 10.

Figure 4:
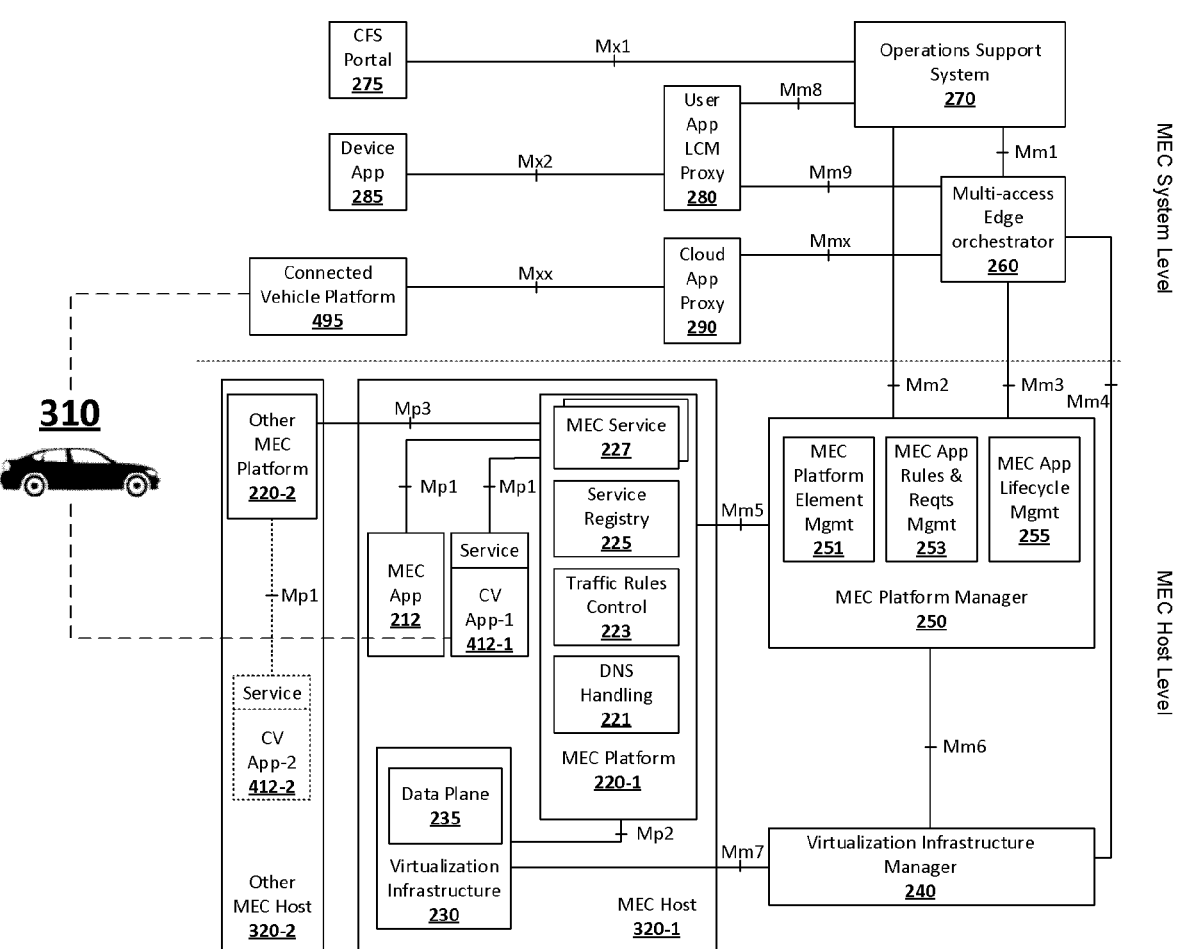
FIG. 4 is a diagram illustrating a specific embodiment of the exemplary reference architecture shown in FIG. 2 in the exemplary scenario shown in FIG. 3.

FIG. 4 is a diagram illustrating a specific embodiment of the exemplary reference architecture shown in FIG. 2 in the exemplary scenario shown in FIG. 3. The vehicle 310 may function as a UE, and may be served by the cells 300 for radio coverage and by the MEC hosts 320 for edge services. Further, the vehicle 310 may be communicatively coupled to a connected vehicle platform (CVP) 495, which functions as a cloud application (e.g. the cloud application 295 shown in FIG. 2) for third party services, such as, provisioning, location reporting, information services, entertainment services, etc. The CVP 495 may exchange information with the MEO 260 via the cloud application proxy (CAP) 290, for example, receiving topology information with regard to the MEC system, reporting a host switching event as will be detailed below, etc.

Further, as shown in FIG. 4, an instance of a connected vehicle (CV) application 412-1 may be running on the MEC host 320-1 which is currently serving the vehicle 310 in the cell 300-1 or 300-2. Further, as also shown in FIG. 4, another instance of the CV application 412-2 may also be deployed in the other MEC host 320-2, which is currently not serving the vehicle 310, for later potential activation. In some other embodiments, the CV application 412-2 may not be deployed until the vehicle 310 is being served or to be served by the MEC host 320-2.

As shown in FIG. 4, the vehicle 310 may communicate with the CV application 412-1 via the radio network, for example, the cell 310-1 or 310-2, to which the MEC host 320-1 shown in FIG. 4 is close. Next, some procedures required by the external assisted application mobility mechanism will be described with reference to FIG. 5 and FIG. 6.

Figure 5:
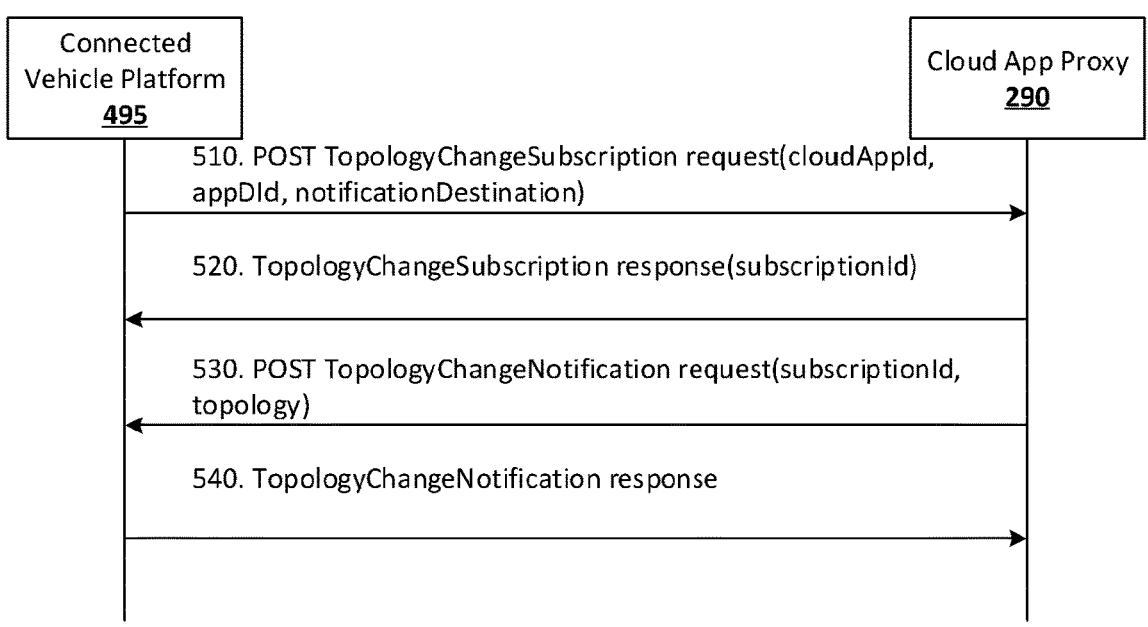
FIG. 5 is a diagram illustrating an exemplary procedure between a connected vehicle platform (CVP) and a cloud application proxy (CAP) for subscribing topology changes according to an embodiment of the present disclosure.

FIG. 5 is a diagram illustrating an exemplary message flow between the CVP 495 and the CAP 290 for subscribing topology changes according to an embodiment of the present disclosure. This procedure is about MEC system exposes topology information to the external cloud application, for example, the CVP 495. The cloud application may start this procedure by subscribing to relevant topology change. After receiving a topology change notification, the cloud application may use its own way to detect an MEC host switch event. For example, the CVP 495 may use geofencing technology to address the needs.

At step 510, the CVP 495 may subscribe an MEC Topology Change service associated with the connected vehicle application (e.g., the CV application 412-1) identified by "appDId" from the CAP 290, for example, by sending a "TopologyChangeSubscription" request message comprising one or more parameters, which may be described below.

At step 520, the CAP 290 may return a "TopologyChangeSubscription" response message with a subscriptionId to the CVP 495 to indicate a successful subscription. The "subscriptionId" may be used by the CAP 290 later to indicate which subscription is related to the topology update transmitted from the CAP 290.

At step 530, the CAP 290 may notify the CVP 495 of MEC topology change information with a "TopologyChangeNotification" request message. The information may include a list of MEC host information including associated location area and deployed user application instances.

At step 540, the CVP 495 may return a "TopologyChangeNotification" response message to the CAP 290 to indicate a successful reception of the latest topology information.

Exemplary messages and data types involved in this procedure are given in below tables, for the purpose of exemplification only.

| TopologyChangeSubscription | | |
|---|---|---|
| Attribute | Data Type | Description |
| cloudAppId | String | Uniquely identifies the cloud application. |
| appDId | String | Identifier of this MEC application descriptor. |
| notificationDestination | Link | An URI of a notification destination that notification message shall be delivered to. |

| TopologyChangeNotification | | |
|---|---|---|
| Attribute | Data Type | Description |
| topology | array(MECHost) | The relevant topology information about MEC system that includes a list of MEC hosts. |

| Data type MECHost | | |
|---|---|---|
| Attribute | Data Type | Description |
| mecHostInformation | MECHostInformation | The MEC host where the application instance is running on. |
| appDId | String | Identifier of this MEC application descriptor. |
| appInstanceId | String | Identifier of the application instance. |
| assocLocationArea | LocationArea | Indicates the serving area of the MEC host. |

| Data type MECHostInformation | | |
|---|---|---|
| Attribute | Data Type | Description |
| hostName | String | Human-readable name of MEC host. |
| hostId | KeyValuePairs | User defined MEC host ID. |

| Data type LocationArea | | |
|---|---|---|
| Attribute | Data Type | Description |
| cellId | array(string) | Indicates a Cell Global Identification of the user which identifies the cell the UE is registered. |
| enodeBId | array(string) | Indicates an eNodeB in which the UE is currently located. |
| routingAreaId | array(string) | Identifies a Routing Area Identity of the user where the UE is located. |
| trackingAreaId | array(string) | Identifies a Tracking Area Identity of the user where the UE is located. |
| geographicArea | array(GeographicArea) | Identifies a geographic area of the user where the UE is located. |
| civicAddress | array(CivicAddress) | Identifies a civic address of the user where the UE is located. |

Please note that some of the attributes may be optional, and therefore can be omitted. For example, in the data type LocationArea, at least one attribute is required, for example, a cellId is good enough for the CVP 495 to identify a range of geographic locations, and therefore other attributes may be omitted for reducing network traffic or signaling overhead.

Further, although FIG. 5 shows that the latest topology information is provided by the CAP 290, the present disclosure is not limited thereto. For example, the CAP 290 may be updated with the latest topology information by another network node, such as a topology information server maintained by the operator of the MEC system, and forward this information to the CVP 495. In some other embodiments, the CAP 290 may have the other network node transmit the information to the CVP 495 directly. In other words, the CAP 290 may function as a relay in this procedure.

With the procedure shown in FIG. 5, the CVP 495 may obtain the latest topology information of the MEC system, which may facilitate the CVP 495 in setting up one or more geofences for accurately detecting host switching events.

Figure 6:
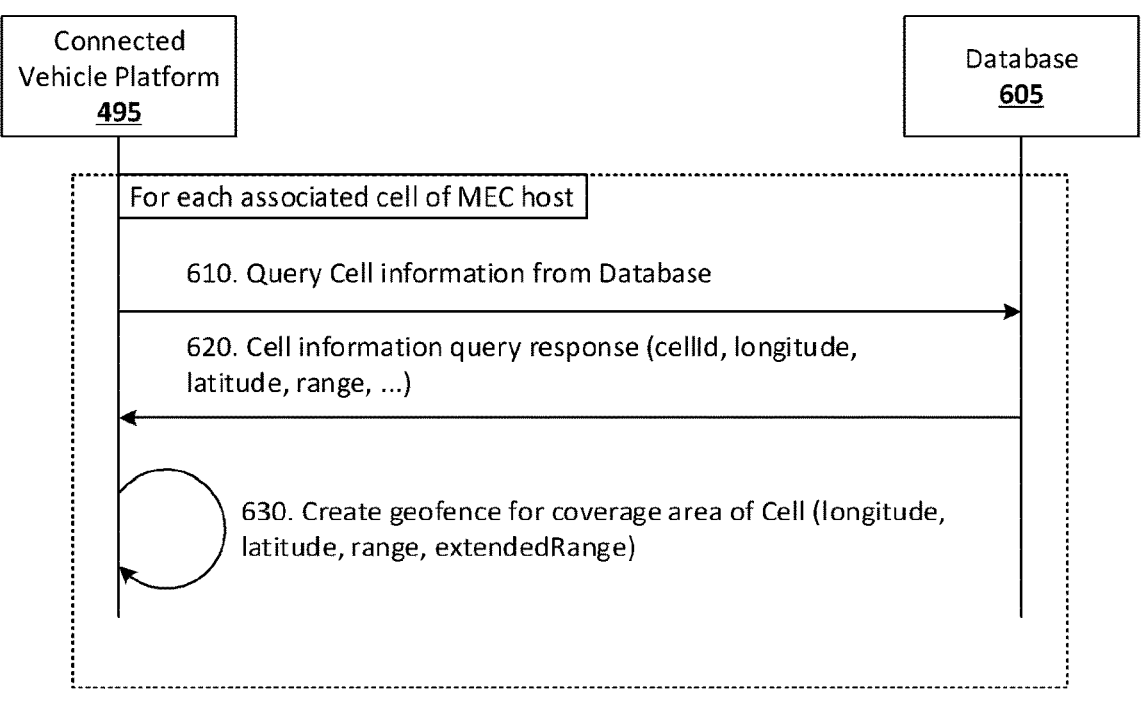
FIG. 6 is a diagram illustrating an exemplary procedure between a connected vehicle platform and a database for creating geofences according to an embodiment of the present disclosure.

FIG. 6 is a diagram illustrating an exemplary procedure between the CVP 495 and a database 605 for creating geofences according to an embodiment of the present disclosure. Since a connected vehicle, such as the vehicle 310, may periodically report its location to the CVP 495, the geofencing technology may be used to detect the events on MEC host switch. The procedure shown in FIG. 6 describes how a geofence is created, for example, after the CVP 495 obtains the latest MEC host topology information from the CAP 290.

For each cell associated with a MEC host, for example, for each of the cells 300-1, and 300-2 associated with the MEC host 320-1, following steps may be performed.

At step 610, the CVP 495 may query cell information from the database 605, for example, by using cellId notified from the CAP 290 as shown in FIG. 5.

At step 620, the database 605 may respond to the query with the cell information. In some embodiments, the cell information may comprise, for example, cellId, longitude and latitude of the cell, range of the cell (e.g., the radius of coverage area the cell). Details of cell information data type may be shown in the following table:

| Data type CellInformation | | |
| --- | --- | --- |
| Attribute | Data Type | Description |
| MCC | String | Mobile County Code. |
| TAC | String | Track Area Code. |
| Cell ID | String | Global identity of a cell |
| Longitude | Double | Longitude of a cell. |
| Latitude | Double | Latitude of a cell. |
| Range | Double | The radius of a circle that represents the coverage area of a cell. |

Also, please note that some of the attributes may be optional.

At step 630, the CVP 495 may create one or more geofences based on the cell information obtained. For example, for each MEC host associated with multiple cells, a geofence surrounding all of the associated cells may be created.

With this procedure, CVP 495 may create geofences for monitoring MEC host switch events for the vehicle 310.

Figure 7:
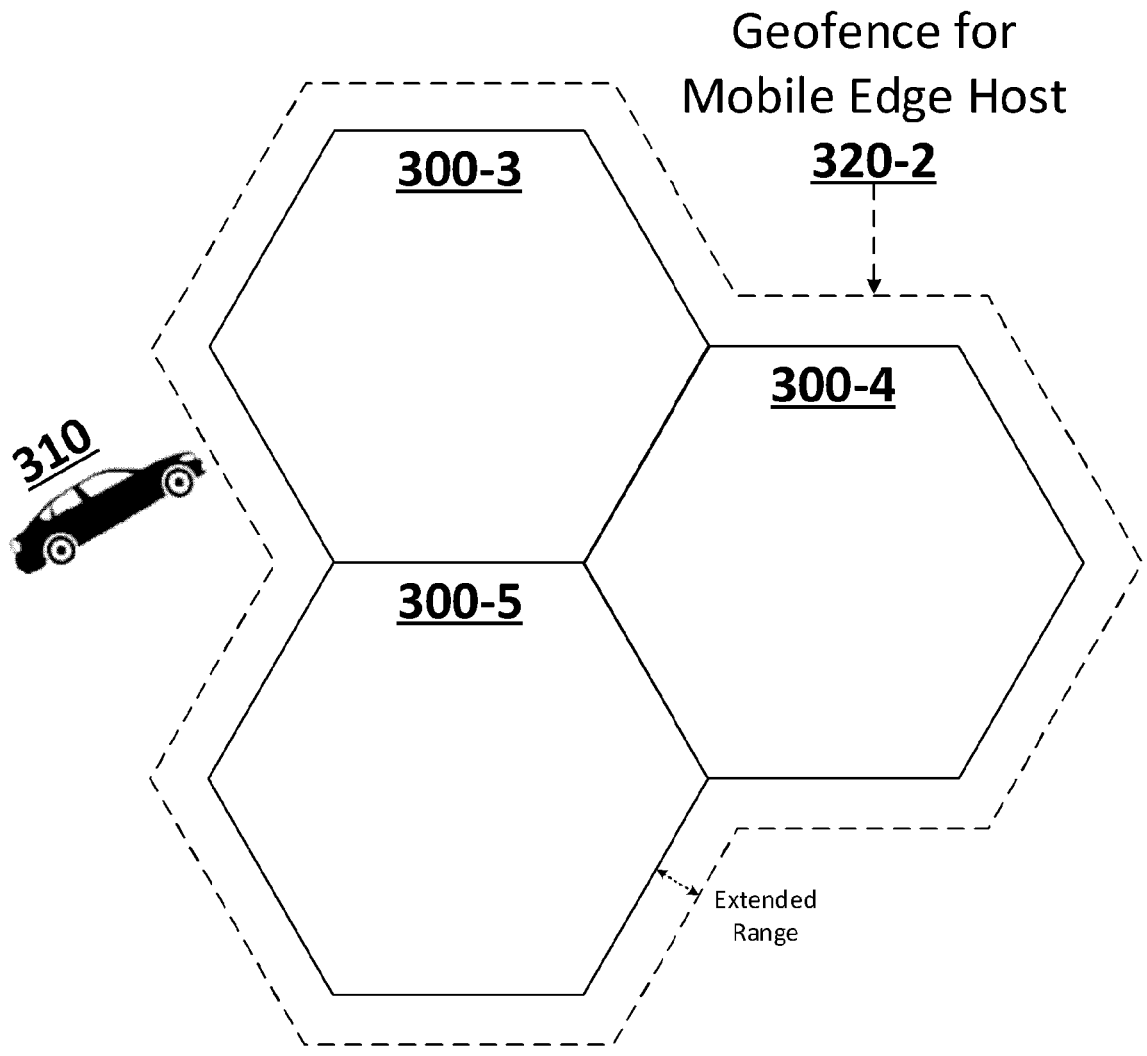
FIG. 7 is a diagram illustrating an exemplary geofence according to an embodiment of the present disclosure.

FIG. 7 is a diagram illustrating an exemplary geofence according to an embodiment of the present disclosure. Please note that although FIG. 7 shows that each of the cells 300-3, 300-4, and 300-5 having a shape of hexagon, they are only shown for the purpose of illustration only. In some other embodiments, a cell may have a different shape of coverage, for example, a circle, or any other regular or irregular shape.

As described with reference to FIG. 6, for each MEC host, for example, the MEC host 320-2, a geofence surrounding all of its associated cells (e.g., the cell 300-3, 300-4, and 300-5 which are associated with the MEC host 320-2) may be created and shown in FIG. 7. As shown in FIG. 7, in order to detect the MEC host switch event beforehand, the geofence may be created in a manner that the geofence boundary is extended by adding a buffer distance (extendedRange, e.g. 50 m in some embodiments, which may depend on many factors, such as vehicle speed, road conditions, etc.) to the cell range, and therefore the geofence has an extended range indicated in FIG. 7. With this extended range, the CVP 495 may detect or predict the mobile host switch event before the vehicle 310 actually enters the area served by the MEC host 320-2, such that the MEC system may have sufficient time for application relocation for the vehicle 310 and reduce response time and latency.

In some embodiments, the CVP 495 may further optimize the geofence boundaries based on spatial data and/or real time traffic data. Further, in some embodiments, a geofence for the MEC host 320-2 may be a parent geofences comprising multiple geofences, and there is a geofence for each of the cells 300-3, 300-4, and 300-5. In other words, the parent geofence may be the union of the geofences of all associated cells. Further, in some embodiments where a cell is characterized as a circle, the CVP 495 may create a geofence for a cell by taking the cell's longitude and latitude as the center of the geofence and the range of the cell (and optionally plus some extended range) as the radius of the geofence.

Figure 8:
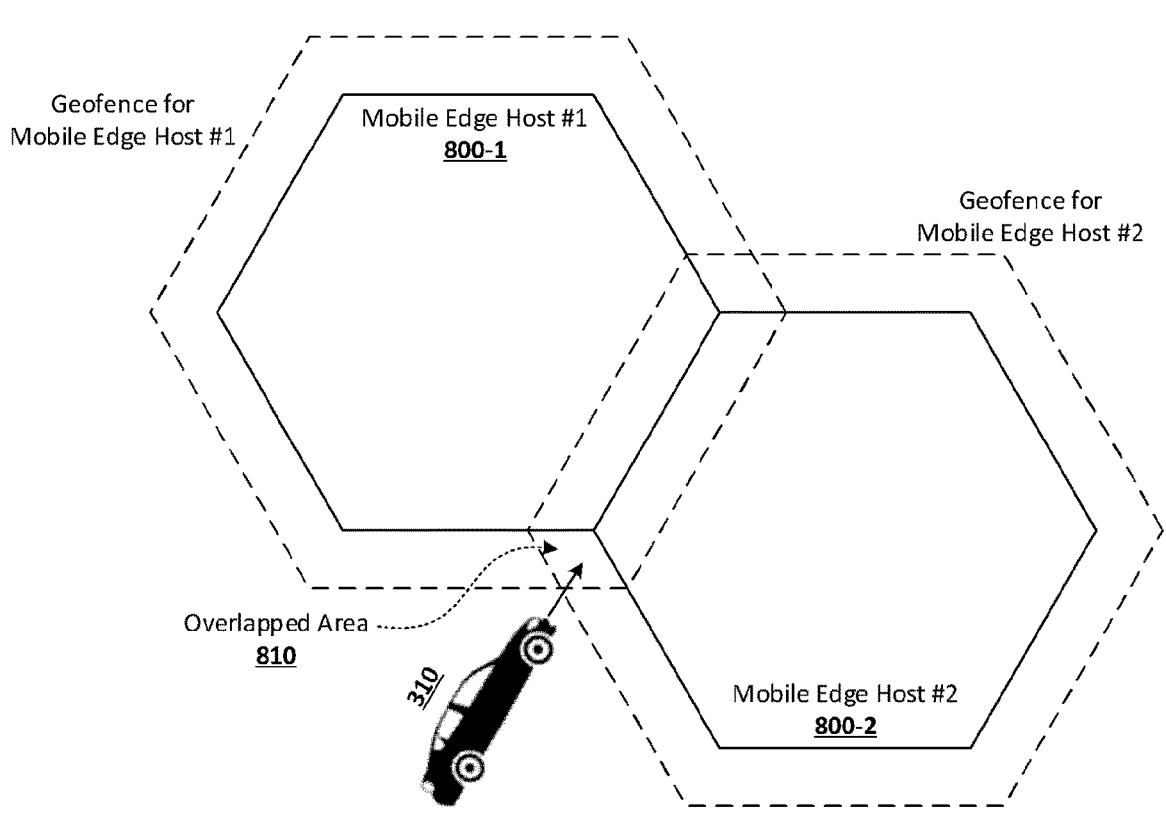
FIG. 8 is a diagram illustrating an exemplary scenario in which a UE may cross boundaries of multiple geofences according to an embodiment of the present disclosure.

FIG. 8 is a diagram illustrating an exemplary scenario in which the vehicle 310 may cross boundaries of multiple geofences according to an embodiment of the present disclosure. As shown in FIG. 8, when the vehicle 310 leaves an MEC host, travels to an overlapped area 810 of the geofences of MEC Host #1 800-1 and MEC Host #2 800-2, the CVP 495 may detect in real-time that the vehicle 310 may soon enter the serving areas of the MEC host #1 800-1 and/or the MEC host #2 800-2, and feedback, to the MEC System, following MEC host switch events:

The vehicle 310 may switch to the MEC host #1 800-1, and

The vehicle 310 may switch to the MEC Host #2 800-2.

Upon reception of these events, the MEC System may trigger application mobility procedures accordingly. Even though the vehicle 310 may eventually enter only one of the MEC host #1 800-1 and the MEC host #2 800-2, the external assisted application mobility mechanism according to some embodiments of the present application will still trigger application mobility to all possible target MEC hosts (in the embodiment shown in FIG. 8, the MEC host #1 800-1 and the MEC host #2 800-2), in order to subsequently secure low latency communication.

Figure 9:
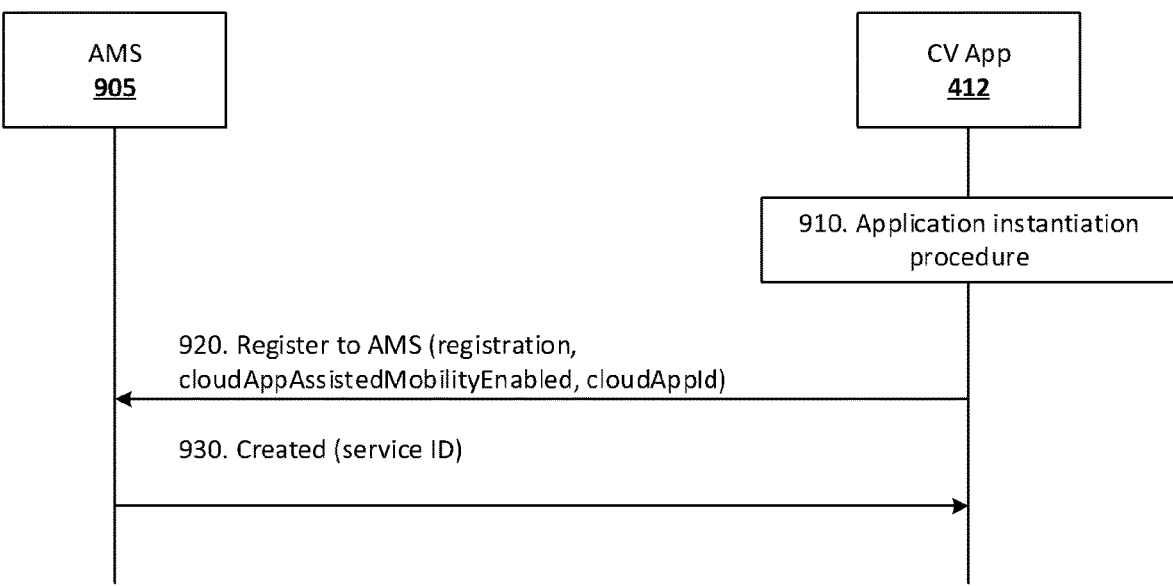
FIG. 9 is a diagram illustrating an exemplary procedure between an AMS and a connected vehicle (CV) application for registering a service according to an embodiment of the present disclosure.

FIG. 9 is a diagram illustrating an exemplary procedure between an AMS 905 and a CV application 412 for registering a service according to an embodiment of the present disclosure. This procedure is an enhancement to current application mobility service registration procedure defined in ETSI GS MEC 021. During the registration, the CV application 412 may inform the AMS 905 that an external cloud application, for example, the CVP 495, will assist the MEC system in detecting MEC host switch event.

To be specific, at step 910, the CV application 412 may be instantiated by the MEO 260. Once instantiated, the CV application 412 may register its service with the AMS 905, for example, by transmitting some parameters, such as, registration, cloudAppAssistedMobilityEnabled, cloudAppId, etc. The parameter "registration" may be defined as registration info data type defined in ETSI GS MEC 021. The parameter "cloudAppAssistedMobilityEnabled" may be used to enable external cloud application to assist in application mobility. The parameter "cloudAppId" may be a parameter used to indicate the external cloud application (e.g., the CVP 495) that will assist application mobility.

At step 930, the AMS 905 may respond to the registration request with a response message indicating a success of the registration, and a service ID will be assigned to the CV application 412 for subsequent use.

With this procedure, the MEC system may be notified by the CV application 412 that there is an external cloud application (e.g., the CVP 495) which may facilitate the MEC system in identifying MEC host switch event.

Figure 10:
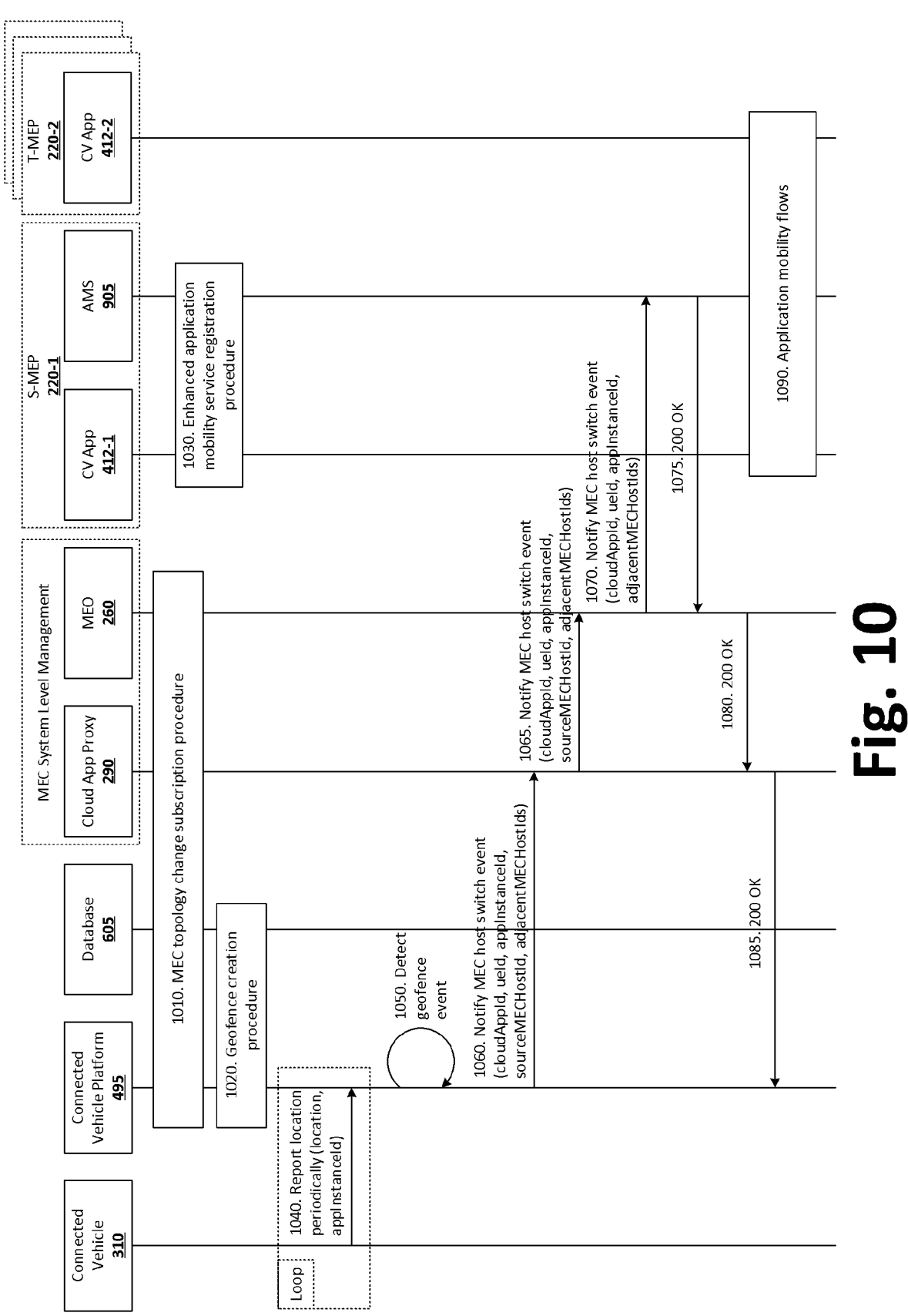
FIG. 10 is a diagram illustrating an exemplary procedure between various nodes for an external assisted application mobility procedure according to an embodiment of the present disclosure.

FIG. 10 is a diagram illustrating an exemplary procedure between various nodes for an external assisted application mobility procedure according to an embodiment of the present disclosure. This procedure is about the end-to-end external assisted application mobility procedure by using a vehicle 310 as an example.

At step 1010, the CVP 495 may subscribe the MEC topology change service via the CAP 290 to get MEC host topology information, for example, by the procedure shown in FIG. 5.

At step 1020, the CVP 495 may create a geofence for each MEC host based on the received MEC topology information, for example, by the procedure shown in FIG. 6.

At step 1030, the CV application 412-1, which is instantiated by the MEO 260 in either a User Application Initialization flow or a User Application Relocation flow, may register to the AMS 905, such that the external assisted application mobility is enabled, for example, by the procedure shown in FIG. 9. Please note that the step 1030 may occur at least partially before, after, or during the steps 1010 and 1020, depending on specific implementations of the MEC system.

At step 1040, the connected vehicle 310 may report, periodically or upon request, its location and the appInstanceId which represents the current CV application instance 412-1 to which the vehicle 310 connects.

At step 1050, the CVP 495 may detect a MEC host switch event for the vehicle 310 by using the geofences created at step 1020.

At step 1060, the CVP 495 may notify the CAP 290 of the detected MEC host switch event, for example, with at least one of following information:

cloudAppId indicating the external cloud application that is CVP 495.

ueId indicating the device that is the vehicle 310 which is associated to the MEC host switch event.

appInstanceId indicating the current CV application instance 412-1 by which the vehicle 310 is served.

sourceMECHostId indicating the current MEC host 320-1 serving the vehicle 310.

adjacentMECHostIds indicating the possible adjacent MEC hosts (e.g. the MEC host 320-2) to which the vehicle 310 will switch.

At step 1065, the CAP 290 may further forward the MEC host switch event to the MEO 260.

At step 1070, the MEO 260 may forward the MEC host switch event to the AMS 905 of the current serving MEP 220-1 of the source MEC host 320-1.

At step 1075, the AMS 905 of the current serving MEP 220-1 may return a success response to the MEO 260.

At step 1080, the MEO 260 may return the success response to the CAP 290.

At step 1085, the CAP 290 may return the success response to the CVP 495.

At step 1090, after receiving the MEC host switch event, the AMS 905 may trigger application mobility flows, for example, those defined in ETSI GS MEC 021.

With the above embodiments, the MEC system may expose topology information to an external cloud application, such as, the CVP 495, the cloud application may use geofencing based on the exposed MEC topology information to detect the MEC host switch event of devices beforehand more accurately. Further, the cloud application may report the detected MEC host switch event to the MEC system to trigger application mobility, such that the latency and response time may be greatly reduced due to an early detection of the MEC host switch event.

FIG. 11 is a flow chart of an exemplary method 1100 at a first network element for assisting a user equipment (UE) in mobile edge host switching according to an embodiment of the present disclosure. The method 1100 may be performed at a first network element (e.g., the CVP 495 shown in FIG. 4). The method 1100 may comprise step S1110, S1120, and Step S1130. However, the present disclosure is not limited thereto. In some other embodiments, the method 1100 may comprise more steps, less steps, different steps, or any combination thereof. Further the steps of the method 1100 may be performed in a different order than that described herein. Further, in some embodiments, a step in the method 1100 may be split into multiple sub-steps and performed by different entities, and/or multiple steps in the method 1100 may be combined into a single step.

The method 1100 may begin at step S1110 where one or more geofences may be set up, one for each of one or more mobile edge hosts, based on topology information of a network comprising the one or more mobile edge hosts. At step S1120 whether the UE moves across the boundary of a first geofence of the geofences may be detected. At step S1130, a message comprising a first indicator indicating a first host switching event for the UE is transmitted to a second network element in response to detecting that the UE moves across the boundary of the first geofence.

In some embodiments, before the step of setting up one or more geofences, the method 1100 may further comprise: receiving, from the second network element, the topology information. In some embodiments, before the step of receiving the topology information, the method 1100 may further comprise: transmitting, to the second network element, a request for subscribing latest topology information of the network; and receiving, from the second network element, a response indicating success of the subscription in response to the request. In some embodiments, the received topology information may comprise at least one of: at least one cell identifier; at least one base station identifier; at least one routing area identifier; at least one tracking area identifier; at least one geographic area information associated with at least one geographic area; and at least one civic address information associated with at least one civic address.

In some embodiments, the step of setting up one or more geofences may comprise: transmitting, to a database, a request for querying geographic information associated with the topology information; receiving, from the database, the geographic information; and setting up the one or more geofences based on the received geographic information. In some embodiments, the geographic information may comprise, for each cell associated with each of the one or more mobile edge hosts, the longitude and latitude of the center of the cell and the radius of the cell. In some embodiments, a geofence for a mobile edge host is a union of sub-geofences corresponding to cells associated with the mobile edge host, each of the sub-geofences having a same center as that of its corresponding cell and a greater radius than that of its corresponding cell by an extended length. In some embodiments, the extended length may be dynamically adjustable on a cell basis.

In some embodiments, the step of detecting whether the UE moves across the boundary of a first geofence of the geofences may comprise: receiving, from the UE, location reports indicating current locations of the UE periodically; determining whether the UE moves across the boundary of the first geofence based on at least two consecutively received location reports, the prior one of which indicating that the UE is located outside of the first geofence and the subsequent one of which indicating that the UE is located inside of the first geofence. In some embodiments, each of the location reports may further comprise an edge application instance ID indicating an edge application instance by which the UE is being served, and wherein the message transmitted to the second network element further comprises the edge application instance ID and a source mobile edge host ID associated with the edge application instance and indicating a mobile edge host currently serving the UE.

In some embodiments, before the step of transmitting, to a second network element, a message comprising a first indicator indicating a first host switching event for the UE in response to detecting that the UE moves across the boundary of the first geofence, the method 1100 may further comprise: detecting whether the UE moves across the boundary of a second geofence of the geofences, wherein the message transmitted to the second network element may further comprise a second indicator indicating a second host switching event for the UE in response to detecting that the UE moves across the boundary of the second geofence.

FIG. 12 is a flow chart of an exemplary method 1200 at a second network element for assisting a user equipment (UE) in mobile edge host switching according to an embodiment of the present disclosure. The method 1200 may be performed at a second network element (e.g., the CAP 290 shown in FIG. 4). The method 1200 may comprise step S1210, S1220, and Step S1230. However, the present disclosure is not limited thereto. In some other embodiments, the method 1200 may comprise more steps, less steps, different steps, or any combination thereof. Further the steps of the method 1200 may be performed in a different order than that described herein. Further, in some embodiments, a step in the method 1200 may be split into multiple sub-steps and performed by different entities, and/or multiple steps in the method 1200 may be combined into a single step.

The method 1200 may begin at step S1210 where topology information of a network comprising one or more mobile edge hosts may be transmitted to a first network element. At step S1220, a first message comprising a first indicator indicating a first host switching event for a UE may be received from the first network element, the UE being served by a source mobile edge host of the one or more mobile edge hosts and the first host switching event being associated with a first mobile edge host of the one or more mobile edge hosts, which is different from the source mobile edge host. At step S1230, a second message comprising a third indicator indicating the first host switching event for the UE may be transmitted to a third network element associated with the source mobile edge host.

In some embodiments, before the step of transmitting the topology information, the method 1200 may further comprise: receiving, from the first network element, a request for subscribing latest topology information of the network; and transmitting, to the first network element, a response indicating success of the subscription in response to the request. In some embodiments, the transmitted topology information may comprise at least one of: at least one cell identifier; at least one base station identifier; at least one routing area identifier; at least one tracking area identifier; at least one geographic area information associated with at least one geographic area; and at least one civic address information associated with at least one civic address. In some embodiments, the first message may further comprise an edge application instance ID indicating an edge application instance by which the UE is being served and a source mobile edge host ID associated with the source mobile edge host, and wherein the second message further comprises the edge application instance ID. In some embodiments, the first message may further comprise a second indicator indicating a second host switching event for the UE, the second host switching event being associated with a second mobile edge host of the one or more mobile edge hosts, which is different from the source mobile edge host and the first mobile edge host, wherein the second message may further comprise a fourth indicator indicating the second host switching event for the UE.

FIG. 13 is a flow chart of an exemplary method 1300 at a third network element for assisting a user equipment (UE) in mobile edge host switching according to an embodiment of the present disclosure. The method 1300 may be performed at a third network element (e.g., the AMS 905 shown in FIG. 9). The method 1300 may comprise step S1310 and S1320. However, the present disclosure is not limited thereto. In some other embodiments, the method 1300 may comprise more steps, less steps, different steps, or any combination thereof. Further the steps of the method 1300 may be performed in a different order than that described herein. Further, in some embodiments, a step in the method 1300 may be split into multiple sub-steps and performed by different entities, and/or multiple steps in the method 1300 may be combined into a single step.

The method 1300 may begin at step S1310 where a second message comprising a third indicator indicating a first host switching event for a user equipment (UE) and an edge application instance ID identifying an edge application instance may be received from a second network element. At step S1320, an application mobility flow for the edge application instance from a source mobile edge host serving the UE to a target mobile edge host associated with the first host switching event may be triggered.

In some embodiments, the second message may further comprise a fourth indicator indicating a second host switching event for the UE, and wherein the method 1300 may further comprise: triggering another application mobility flow for the edge application instance from the source mobile edge host serving the UE to another target mobile edge host associated with the second host switching event. In some embodiments, the method 1300 may further comprise: receiving a request for registering an edge application instance which may be executed at the source mobile edge host, the request comprising an indicator indicating that an external cloud application corresponding to the edge application instance is capable of assisting UEs in mobile edge host switching.

FIG. 14 schematically shows an embodiment of an arrangement which may be used in a first network element, a second network element, and/or a third network element according to an embodiment of the present disclosure. Comprised in the arrangement 1400 are a processing unit 1406, e.g., with a Digital Signal Processor (DSP) or a Central Processing Unit (CPU). The processing unit 1406 may be a single unit or a plurality of units to perform different actions of procedures described herein. The arrangement 1400 may also comprise an input unit 1402 for receiving signals from other entities, and an output unit 1404 for providing signal(s) to other entities. The input unit 1402 and the output unit 1404 may be arranged as an integrated entity or as separate entities.

Furthermore, the arrangement 1400 may comprise at least one computer program product 1408 in the form of a non-volatile or volatile memory, e.g., an Electrically Erasable Programmable Read-Only Memory (EEPROM), a flash memory and/or a hard drive. The computer program product 1408 comprises a computer program 1410, which comprises code/computer readable instructions, which when executed by the processing unit 1406 in the arrangement 1400 causes the arrangement 1400 and/or the first network element and/or the second network element in which it is comprised to perform the actions, e.g., of the procedure described earlier in conjunction with FIG. 5, FIG. 6, FIG. 9, and FIG. 10 or any other variant.

The computer program 1410 may be configured as a computer program code structured in computer program modules 1410A-1410C. Hence, in an exemplifying embodiment when the arrangement 1400 is used in the first network element, the code in the computer program of the arrangement 1400 includes: a setting module 1410A for setting up one or more geofences, one for each of one or more mobile edge hosts, based on topology information of a network comprising the one or more mobile edge hosts; a detecting module 1410B for detecting whether the UE moves across the boundary of a first geofence of the geofences; and a transmitting module 1410C for transmitting, to a second network element, a message comprising a first indicator indicating a first host switching event for the UE in response to detecting that the UE moves across the boundary of the first geofence.

The computer program 1410 may be further configured as a computer program code structured in computer program modules 1410D-1410F. Hence, in an exemplifying embodiment when the arrangement 1400 is used in the second network element, the code in the computer program of the arrangement 1400 includes: a transmitting module 1410D for transmitting, to a first network element, topology information of a network comprising one or more mobile edge hosts; a receiving module 1410E for receiving, from the first network element, a first message comprising a first indicator indicating a first host switching event for a UE, the UE being served by a source mobile edge host of the one or more mobile edge hosts and the first host switching event being associated with a first mobile edge host of the one or more mobile edge hosts, which is different from the source mobile edge host; and a transmitting module 1410F for transmitting, to a third network element associated with the source mobile edge host, a second message comprising a third indicator indicating the first host switching event for the UE.

The computer program 1410 may be further configured as a computer program code structured in computer program modules 1410G-1410H. Hence, in an exemplifying embodiment when the arrangement 1400 is used in the third network element, the code in the computer program of the arrangement 1400 includes: a receiving module 1410G for receiving, from a second network element, a second message comprising a third indicator indicating a first host switching event for a user equipment (UE) and an edge application instance ID identifying an edge application instance; and a triggering module 1410H for triggering an application mobility flow for the edge application instance from a source mobile edge host serving the UE to a target mobile edge host associated with the first host switching event.

The computer program modules could essentially perform the actions of the flow illustrated in FIG. 5, FIG. 6, FIG. 9, and FIG. 10, to emulate the first network element, the second network element, or the third network element. In other words, when the different computer program modules are executed in the processing unit 1406, they may correspond to different modules in the first network element, the second network element, or the third network element.

Although the code means in the embodiments disclosed above in conjunction with FIG. 14 are implemented as computer program modules which when executed in the processing unit causes the arrangement to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

| Abbreviation | Explanation |
| --- | --- |
| AMS | Application Mobility Service |
| CV | Connected Vehicle |
| MEC | Multi-access Edge Computing |
| MEO | Multi-access Edge Orchestrator |
| MEP | Multi-access Edge Platform |
| S-MEP | Source Multi-access Edge Platform |
| T-MEP | Target Multi-access Edge Platform |
| RNIS | Radio Network Information Service |

What is claimed is:

1. A method at a first network element for assisting a user equipment (UE) in mobile edge host switching, the method comprising:

setting up one or more geofences, one for each of one or more mobile edge hosts, based on topology information of a network comprising the one or more mobile edge hosts, setting up one or more geofences comprising:

transmitting, to a database, a request for querying geographic information associated with the topology information, the geographic information comprising, for each cell associated with each of the one or more mobile edge hosts, the longitude and latitude of the center of the cell and the radius of the cell;

receiving, from the database, the geographic information; and setting up the one or more geofences based on the received geographic information;

detecting whether the UE moves across the boundary of a first geofence of the geofences; and transmitting, to a second network element, a message comprising a first indicator indicating a first host switching event for the UE in response to detecting that the UE moves across the boundary of the first geofence.

2. The method of claim 1, where before the step of setting up one or more geofences, the method further comprises:

receiving, from the second network element, the topology information.

3. The method of claim 2, wherein before the step of receiving the topology information, the method further comprises:

transmitting, to the second network element, a request for subscribing latest topology information of the network; and receiving, from the second network element, a response indicating success of the subscription in response to the request.

4. The method of claim 2, wherein the received topology information comprises at least one of:

at least one cell identifier;

at least one base station identifier;

at least one routing area identifier;

at least one tracking area identifier;

at least one geographic area information associated with at least one geographic area; and at least one civic address information associated with at least one civic address.

5. The method of claim 1, wherein a geofence for a mobile edge host is a union of sub-geofences corresponding to cells associated with the mobile edge host, each of the sub-geofences having a same center as that of its corresponding cell and a greater radius than that of its corresponding cell by an extended length.

6. The method of claim 5, wherein the extended length is dynamically adjustable on a cell basis.

7. The method of claim 1, wherein the step of detecting whether the UE moves across the boundary of a first geofence of the geofences comprises:

receiving, from the UE, location reports indicating current locations of the UE periodically;

determining whether the UE moves across the boundary of the first geofence based on at least two consecutively received location reports, the prior one of which indicating that the UE is located outside of the first geofence and the subsequent one of which indicating that the UE is located inside of the first geofence.

8. The method of claim 7, wherein each of the location reports further comprises an edge application instance ID indicating an edge application instance by which the UE is being served, and wherein the message transmitted to the second network element further comprises the edge application instance ID and a source mobile edge host ID associated with the edge application instance and indicating a mobile edge host currently serving the UE.

9. The method of claim 1, wherein before the step of transmitting, to a second network element, a message comprising a first indicator indicating a first host switching event for the UE in response to detecting that the UE moves across the boundary of the first geofence, the method further comprises:

detecting whether the UE moves across the boundary of a second geofence of the geofences, wherein the message transmitted to the second network element further comprises a second indicator indicating a second host switching event for the UE in response to detecting that the UE moves across the boundary of the second geofence.

10. A first network element, comprising:

a processor;

a memory storing instructions which, when executed by the processor, cause the processor to:

set up one or more geofences, one for each of one or more mobile edge hosts, based on topology information of a network comprising the one or more mobile edge hosts, setting up one or more geofences comprising:

transmitting, to a database, a request for querying geographic information associated with the topology information, the geographic information comprising, for each cell associated with each of the one or more mobile edge hosts, the longitude and latitude of the center of the cell and the radius of the cell;

receiving, from the database, the geographic information; and setting up the one or more geofences based on the received geographic information;

detect whether the UE moves across the boundary of a first geofence of the geofences; and transmit, to a second network element, a message comprising a first indicator indicating a first host switching event for the UE in response to detecting that the UE moves across the boundary of the first geofence.

* * * * *